(12) United States Patent
Matsumoto et al.

(10) Patent No.: US 8,932,728 B2
(45) Date of Patent: Jan. 13, 2015

(54) ALUMINUM-ALLOY CLAD SHEET

(71) Applicant: Kobe Steel, Ltd., Kobe-shi (JP)

(72) Inventors: Katsushi Matsumoto, Kobe (JP); Masao Kinefuchi, Kobe (JP); Takahiro Izumi, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 165 days.

(21) Appl. No.: 13/772,582

(22) Filed: Feb. 21, 2013

(65) Prior Publication Data

US 2013/0244051 A1 Sep. 19, 2013

(30) Foreign Application Priority Data

Mar. 15, 2012 (JP) ................................. 2012-059128
Mar. 15, 2012 (JP) ................................. 2012-059129

(51) Int. Cl.
| | |
|---|---|
| *F28F 21/08* | (2006.01) |
| *B32B 15/20* | (2006.01) |
| *B23K 35/02* | (2006.01) |
| *B32B 15/01* | (2006.01) |
| *B23K 35/28* | (2006.01) |
| *C22C 21/00* | (2006.01) |
| *C22C 21/02* | (2006.01) |
| *C22C 21/10* | (2006.01) |
| *C22C 21/14* | (2006.01) |
| *C22C 21/16* | (2006.01) |
| *B23K 1/00* | (2006.01) |

(52) U.S. Cl.
CPC ........... *B23K 35/0238* (2013.01); *B32B 15/016* (2013.01); *B23K 35/286* (2013.01); *F28F 21/084* (2013.01); *C22C 21/00* (2013.01); *C22C 21/02* (2013.01); *C22C 21/10* (2013.01); *C22C 21/14* (2013.01); *C22C 21/16* (2013.01); *B23K 1/0012* (2013.01); *Y10S 165/905* (2013.01)
USPC ............................ 428/654; 165/905; 148/535

(58) Field of Classification Search
None
See application file for complete search history.

(56) References Cited

U.S. PATENT DOCUMENTS

| | | | | |
|---|---|---|---|---|
| 6,921,584 | B2 * | 7/2005 | Syslak et al. | 428/654 |
| 7,387,844 | B2 * | 6/2008 | Ueda et al. | 428/654 |
| 8,043,711 | B2 | 10/2011 | Koshigoe et al. | |

(Continued)

FOREIGN PATENT DOCUMENTS

| | | |
|---|---|---|
| JP | 8-246117 A | 9/1996 |
| JP | 2002-126894 A | 5/2002 |
| JP | 2009-191293 A | 8/2009 |

*Primary Examiner* — John J Zimmerman
(74) *Attorney, Agent, or Firm* — Oblon, Spivak, McClelland, Maier & Neustadt, L.L.P.

(57) ABSTRACT

There are provided an aluminum-alloy clad sheet and a clad sheet subjected to heating equivalent to brazing, which each have a high strength and an excellent erosion resistance and thus allow a reduction in thickness of a clad sheet subjected to heating equivalent to brazing such as an aluminum alloy radiator tube, and/or of a clad sheet such as an aluminum-alloy brazing sheet. An aluminum-alloy clad sheet or a clad sheet subjected to heating equivalent to brazing includes at least a core aluminum alloy sheet and an aluminum-alloy sacrificial anti-corrosive material cladded with each other, and is to be formed into a heat exchanger by brazing. The core aluminum alloy sheet includes a specified 3000 series composition. Furthermore, the strength and the erosion resistance of the core aluminum alloy sheet are improved through control of grain size distribution of precipitates having a size in a specified level in the core aluminum alloy sheet, or control of the average number density and the composition of dispersed particles therein.

9 Claims, 2 Drawing Sheets

(56) References Cited

U.S. PATENT DOCUMENTS

| | | |
|---|---|---|
| 8,343,635 B2* | 1/2013 | Matsumoto et al. .......... 428/654 |
| 2009/0165901 A1* | 7/2009 | Koshigoe et al. ............. 148/535 |
| 2010/0183897 A1* | 7/2010 | Kobayashi et al. ........... 428/654 |
| 2011/0014494 A1 | 1/2011 | Matsumoto et al. |
| 2011/0287276 A1* | 11/2011 | Izumi et al. ................... 428/548 |
| 2011/0287277 A1* | 11/2011 | Kimura et al. ................ 428/555 |
| 2012/0231293 A1* | 9/2012 | Kobayashi et al. ........... 428/654 |

* cited by examiner

ALUMINUM-ALLOY CLAD SHEET

BACKGROUND OF THE INVENTION

1. Field of the Invention

The present invention relates to an aluminum-alloy clad sheet having high strength and excellent erosion resistance, which is used for an aluminum-alloy heat exchanger (hereinafter, aluminum may be referred to as Al).

2. Description of Related Art

To reduce weight of a motor vehicle body, aluminum alloy materials are increasingly used for the components of the motor vehicle, such as a heat exchanger component, in place of typically used copper alloy materials. An anti-corrosive aluminum alloy material formed of a multilayered clad sheet (sometimes referred to as clad material) is used for the aluminum alloy materials for a heat exchanger component. The clad sheet includes at least a core aluminum alloy sheet and an aluminum-alloy sacrificial anti-corrosive material cladded with each other. The clad sheet is a raw material for a heat exchanger, which is formed into a heat exchanger by brazing. Hence, a simply called aluminum clad sheet (or clad sheet) refers to an aluminum-alloy clad sheet (simply referred to as clad sheet in some case) before being brazed or being subjected to heating corresponding to brazing.

In the case where the clad sheet is assembled into a heat exchanger by brazing, the clad sheet is configured as a clad sheet (brazing sheet) including a core (sheet) of which one surface is cladded with an aluminum-alloy sacrificial anti-corrosive material (sheet), and the other surface is cladded with an aluminum-alloy brazing material (sheet).

FIG. 3 illustrates an exemplary aluminum-alloy heat exchanger (radiator) for a motor vehicle. As illustrated in FIG. 3, a radiator 100 generally has a configuration where aluminum-alloy radiating fins 112, each being formed into a corrugated shape, are integrally provided between a plurality of flat aluminum alloy tubes 111, and the respective ends of the tube 111 are opened to a header 113 and an undepicted tank. In the radiator 100 having such a configuration, a hot coolant is fed from a space of one tank to a space of the other tank through the tube 111, during which the coolant is cooled through heat exchange at the sites of the tube 111 and the radiating fins 112, and the cooled coolant is recirculated.

The tube 111 including the aluminum alloy material is formed of an aluminum-alloy brazing sheet 101 the section of which is illustrated in FIG. 4. In FIG. 4, the brazing sheet 101 includes an aluminum-alloy core 102 of which one side is cladded with an aluminum-alloy sacrificial anode material (sometimes referred to as skin material) 103, and the other side is cladded with an aluminum-alloy brazing material 104. In the case of an aluminum-alloy clad sheet illustrated in FIG. 4, only an aluminum-alloy sacrificial anti-corrosive material 103 is laminated on one surface of an aluminum-alloy core 102.

Such brazing sheet 101 is formed into a flat tube shape by, for example, forming rolls. The shaped brazing sheet 101 is then brazed by itself through resistance welding or heating for brazing into a fluid path formed of the tube 111 illustrated in FIG. 3.

The coolant used in the radiator includes a water-soluble medium as a main component to which a commercially available corrosion inhibitor and/or other agents are appropriately added. If the corrosion inhibitor is aged, however, acid is formed and may corrode the aluminum alloy materials such as the sacrificial material and the core. Hence, an aluminum alloy material having high corrosion resistance against the water-soluble medium must be used.

Hence, Al—Mn series (JIS 3000 series) alloy such as 3003 alloy having a composition of, for example, Al-0.15 mass % Cu-1.1 mass % Mn, which is specified in JIS H4000 is used as the aluminum alloy used for the brazing sheet or the clad sheet in light of corrosion resistance and strength. In addition, Al—Zn series alloy such as 7072 alloy having a composition of, for example, Al-1 mass % Zn or Al—Zn—Mg series (JIS 7000 series) alloy is used for the skin material 103, which is normally in contact with the coolant, in order to secure corrosion resistance and increase strength through diffusion of Mg into the core 102. Furthermore, Al—Si series (JIS 4000 series) alloy having a low melting point, such as 4045 alloy having a composition of, for example, Al-10 mass % Si, is used for the brazing material 104.

The radiator 100 is integrally assembled from the tubes 111 formed of such a brazing sheet 101, the corrugated radiating fins 112, and other components by brazing. The brazing technique includes flux brazing and Nocolok brazing using a noncorrosive flux, which are each performed at high temperature of about 600° C.

The above-described liquid coolant, which ranges from high temperature to low temperature and from high pressure to normal pressure, is normally distributed and circulated within the radiator 100, particularly the tube 111, assembled in the above way. Specifically, the tube 111 receives repeated stress for a long time due to such repeated variations in internal pressure, vibration of the motor vehicle itself, and/or other factors; hence, the tube 111 must have a sufficient strength to withstand such stress. If the tube 111 has a low strength, a fatigue failure may occur, which leads to a crack that develops in the tube 111. If the crack penetrates the tube 111, liquid leakage from the radiator is caused. Hence, improvement in strength of the radiator tube is an important issue.

Various proposals have been made to improve the strength or the fatigue characteristics of the radiator tube. In a typical proposal, average grain diameter of the core of the aluminum-alloy brazing sheet is controlled to improve resistance to the fatigue failure due to repeated bending of the tube 111, i.e., resistance to vibration fatigue under vibration of a motor vehicle. In another proposal, specific precipitates (intermetallic compounds) are distributed in a region of the core close to the boundary between the core and the sacrificial material of the brazed brazing sheet, in order to increase the strength of the region and improve the fatigue characteristics thereby.

In each of the proposals, however, the core of the radiator tube of the motor vehicle has a relatively large thickness, which is far above 0.20 mm. On the other hand, weight of the radiator is reduced for weight reduction of the motor vehicle to improve fuel efficiency in light of the global environmental issues. Thus, investigation is being made on further reduction in thickness of the radiator tube, namely, thickness of the aluminum-alloy brazing sheet.

In the case where the core of the radiator tube has a relatively large thickness as described above, the tube itself has a relatively high stiffness. In contrast, if thickness of the radiator tube, mainly thickness of the clad sheet such as brazing sheet is reduced, the tube itself has a relatively low stiffness. In addition, the coolant to be used is increasingly set to high pressure compared with in the past. The synergic effect among them results in an increase in sensitivity to the fatigue failure caused by the repeated stress in the clad sheet such as the brazing sheet having a reduced thickness. As a result, the clad sheet is likely to be degraded in fatigue characteristics. Such a fatigue failure causes a crack in the radiator tube. Such a crack is likely to penetrate the tube having a reduced thickness, which leads to liquid leakage from the radiator, resulting in a serious damage of the radiator.

Moreover, if the thickness of the clad sheet such as the brazing sheet is reduced, an erosion phenomenon may occur, i.e., the brazing material of the Al alloy brazing sheet erodes the core, leading to a reduction in thickness of the core. This also seriously damages the radiator.

Various ideas have been proposed on improvement in strength, fatigue characteristics, and/or erosion resistance of the radiator tube having such a reduced thickness. Such ideas typically include control of fine precipitates (intermetallic compounds). For example, in JP-A-8-246117, while the clad sheet has a thickness of about 0.25 mm, the core contains intermetallic compounds each having a size of about 0.02 to 0.2 μm in the number density of 10 to 2000 per cubic micrometer. The intermetallic compounds serve to improve the strength of the clad sheet through dispersion hardening, and to make recrystallized grains, which are formed in the clad sheet during heating for brazing, into a coarse pancake shape. In addition, diffusion elements are trapped at boundaries of the grains, which prevents variation of the composition of the core due to diffusion of the elements during brazing.

In JP-A-2002-126894, the average grain diameter of the core is reduced to 50 μm or less, and the number of compounds containing Al and Mn 0.01 to 0.1 μm (10 to 100 nm) in diameter, which are observed by a transmission electron microscope (TEM) at 60,000 power, is controlled to improve the erosion resistance.

In JP-A-2009-191293, a core aluminum alloy sheet having a small thickness of less than 0.25 mm has a structure where precipitates within a range of an average circle-equivalent diameter of 0.1 to 0.5 μm (100 to 500 nm) have an average number density of 150 per cubic micrometer or less, the precipitates being observed by TEM at 50,000 power on a rolling plane in the central part in the thickness of the core aluminum alloy sheet. This is based on the following finding described in JP-A-2009-191293. That is, the brazing sheet reduced in thickness has fatigue characteristics having two mechanisms of the fatigue failure, i.e., a first mechanism where propagation (speed) of a crack caused by a fatigue failure is dominant rather than initiation of the crack, and a second mechanism where initiation of a crack caused by a fatigue failure is dominant rather than propagation (speed) of the crack.

Specifically, different approaches, which are metallurgically effective for improving the fatigue characteristics, are taken for the two mechanisms of the fatigue failure. In the case where propagation (speed) of a crack caused by a fatigue failure is dominant rather than initiation of the crack, the propagation (speed) of the fatigue failure is greatly affected by the structure of the core aluminum alloy sheet of the clad sheet configuring a heat exchanger, i.e., affected by the average grain size and the average number density of relatively fine precipitates. In contrast, in the case where initiation of a crack caused by a fatigue failure is dominant rather than propagation (speed) of the crack, probability of the initiation of the crack is greatly affected by the structure of the core aluminum alloy sheet of the clad sheet configuring a heat exchanger, i.e., affected by the average grain size and the average number density of relatively coarse dispersed particles.

In particular, the approach described in JP-A-2009-191293 improves the fatigue characteristics in the case where propagation (speed) of a crack caused by a fatigue failure is dominant rather than initiation of the crack, which controls the average grain size and the average number density of relatively fine precipitates in the structure of the core aluminum alloy sheet as a raw material for the heat exchanger, or in the structure of the core aluminum alloy sheet subjected to heating equivalent to brazing in order to suppress the propagation of the fatigue failure so that the fatigue life (fatigue characteristics) is improved in the case where the propagation of the fatigue failure is dominant. In JP-A-2009-191293, the precipitates are assumed to be a general term of intermetallic compounds between alloy elements such as Si, Cu, Mn, and Ti or between inevitable elements such as Fe and Mg, and intermetallic compounds between the elements and Al, each of which can be identified based on the size through structure observation regardless of the constituent elements (composition).

SUMMARY OF THE INVENTION

In a current trend, however, there is a demand for a brazing sheet that has a core having a small thickness of less than 0.20 mm, compared with the existing brazing sheets, and has high strength and excellent erosion resistance.

For such a brazing sheet including the core having a small thickness of less than 0.17 mm, the above-described improvement ideas in the related art, such as control of the structure of the core aluminum alloy sheet, i.e., control of the average grain size and the number density of the fine precipitates, are in fact insufficient for achieving the demanded high strength and excellent erosion resistance.

In light of such a problem, an object of the invention is to provide an aluminum-alloy clad sheet for an aluminum-alloy heat exchanger, which allows improvement in strength and erosion resistance of a brazing sheet even if the core of the brazing sheet has a reduced thickness.

To solve the above-described issues, the inventors have got the following findings according to a first technology through various investigations.

The inventors have found that the properties of the brazing sheet including the core having a reduced thickness of less than 0.17 mm are affected by the grain size distribution of the precipitates, each having a so-called submicron-level size, controlled in the related art. Specifically, the first technology is in common with the related art in that the strength and erosion resistance of the brazing sheet including the core having the reduced thickness are affected by the precipitates, each having a so-called submicron-level size, controlled in the related art. The inventors, however, have found that, for the brazing sheet including the core having the reduced thickness, the strength and the erosion resistance are not effectively improved only through the rough control of the submicron-level precipitates each having a circle-equivalent diameter of 100 nm or less, or control of only the density and/or the number of the precipitates as in the related art.

Through a further investigation, the inventors have found that, for the brazing sheet including the core having the reduced thickness, by contrast with the existing recognition, the submicron-level precipitates each having a circle-equivalent diameter of 100 nm or less (hereinafter, appropriately referred to as dispersed particles) have a significant effect on improvement in strength and erosion resistance, and therefore the precipitates should be actively contained in large numbers in the structure instead of being controlled.

In addition, the inventors have also found that grain size distribution of the dispersed particles each having a circle-equivalent diameter of 100 nm or less (hereinafter, appropriately referred to as fine dispersed particles), i.e., density of the fine dispersed particles at each of various size levels (grain size) greatly affects the strength and the erosion resistance. In other words, through finely grouping that submicron level into three sublevels, i.e., 10 to 100 nm, 10 to 60 nm, and 10 to 40 nm, the inventors have reached the following findings: instead of the roughly determined density of the dispersed particles within a range of the circle-equivalent diameter of 100 nm or less, finely determined density (average number density) of the precipitates (dispersed particles) within each of the circle-equivalent diameter ranges of 10 to 100 nm, 10 to 60 nm, and 10 to 40 nm, namely, grain size distribution of the precipitates (fine dispersed particles) greatly affects the strength and the erosion resistance.

On the basis of the various findings described hereinbefore, to achieve the object of the invention, the gist of the first technology of an aluminum-alloy clad sheet of the invention includes an aluminum-alloy clad sheet to be formed into a heat exchanger by brazing, the aluminum-alloy clad sheet including at least a core aluminum alloy sheet and an aluminum-alloy sacrificial anti-corrosive material cladded with each other, wherein the aluminum-alloy clad sheet has an aluminum alloy composition containing, in percent by mass, 0.5 to 1.8% Mn, 0.2 to 1.5% Si, 0.05 to 1.2% Cu, and 0.03 to 0.3% Ti, containing Fe controlled to be 1.0% or less (including 0%), and containing one or more of 0.02 to 0.4% Cr, 0.02 to 0.4% Zr, and 0.02 to 0.4% Ni, with the remainder including Al and inevitable impurities, and precipitates each having a circle-equivalent diameter of 100 nm or less, the precipitates being observed by TEM at 10,000 power on a rolling plane in the central part in the thickness of the core aluminum alloy sheet, have a grain size distribution, in which average number density of the precipitates within a range of the circle-equivalent diameter of 10 to 100 nm is 30 per cubic micrometer or more, average number density of the precipitates within a range of the circle-equivalent diameter of 10 to 60 nm is 15 per cubic micrometer or more, and average number density of the precipitates within a range of the circle-equivalent diameter of 10 to 40 nm is 1.5 per cubic micrometer or more.

The core aluminum alloy sheet of the clad sheet preferably further contains 0.2 to 1.0% Zn. Furthermore, the core aluminum alloy sheet of the clad sheet is preferably further controlled in Mg content to be 0.5 mass % or less. Moreover, the core aluminum alloy sheet of the clad sheet preferably has a small thickness of less than 0.17 mm. Moreover, the clad sheet preferably has a small thickness of less than 0.2 mm.

The core aluminum alloy sheet of the clad sheet preferably has a structure subjected to the heating equivalent to brazing, wherein the core aluminum alloy sheet has an average crystal grain size of 100 to 200 µm in a rolling direction in a longitudinal section along the rolling direction, and precipitates each having a circle-equivalent diameter of 100 nm or less, the precipitates being observed by TEM at 10,000 power on a rolling plane in the central part in the thickness of the core aluminum alloy sheet, have a grain size distribution, in which average number density of the precipitates within a range of the circle-equivalent diameter of 10 to 100 nm is 25 per cubic micrometer or more, average number density of the precipitates within a range of the circle-equivalent diameter of 10 to 60 nm is 10 per cubic micrometer or more, and average number density of the precipitates within a range of the circle-equivalent diameter of 10 to 40 nm is 1.2 per cubic micrometer or more, and average number density of the precipitates within a range of an average diameter of 0.1 to 0.5 µm is 80 per cubic micrometer or less.

In the first technology of the invention, the number of the dispersed particles each having a circle-equivalent diameter of 100 nm or less is actively contained (dispersed) in large numbers contrary to the related art in which the number of the dispersed particles is controlled and/or specified. In addition, in the invention, the large number of actively contained, fine dispersed particles are grouped into three levels on the basis of sizes of the individual precipitates at a level of the circle-equivalent diameter of 100 nm or less, and the average number density of the dispersed particles in each level is specified to control the grain size distribution of the dispersed particles.

Consequently, in the first technology of the invention, while the grain size distribution of the fine dispersed particles is controlled to be within a preferable range, a large number of the fine dispersed particles are actively contained in the structure, thereby enabling improvement in strength and erosion resistance by the effect of the fine dispersed particles.

The precipitates, of which the grain size distribution is controlled within the preferable range as in the invention, are not contained (dispersed) in the structure in the appropriate number only through the rough control of the density or the number of the precipitates each having a diameter of 0.01 to 0.1 m (10 to 100 nm) as in JP-A-2002-126894. The rough control therefore has no significant effect on the strength and the erosion resistance of the brazing sheet including the core having a reduced thickness of less than 0.17 mm. Moreover, the precipitates, of which the grain size distribution is controlled within the preferable range as in the invention, are also not contained (dispersed) in the appropriate number in the structure only through the rough control of the average number density of the precipitates within a range of an average circle-equivalent diameter of 0.1 to 0.5 µm (100 to 500 nm) as in JP-A-2009-191293. The rough control therefore has no significant effect on the strength and the erosion resistance of the brazing sheet including the core having a relatively small thickness of less than 0.20 mm.

Moreover, to solve the above-described issues, the inventors have got the following findings according to a second technology through various investigations.

The inventors have found that, in the brazing sheet including the core having a reduced thickness of less than 0.17 mm, the erosion resistance necessary for the heat exchanger is greatly affected by the number density of the precipitates, i.e., the dispersed particles, contained in the core aluminum alloy sheet, and the strength is greatly affected not only by the number density of the dispersed particles but also by the composition thereof.

Specifically, the second technology of the invention is also in common with the related art in that the strength and erosion resistance of the thin brazing sheet are affected by the precipitates contained in the structure of the core. The inventors, however, have found that, for the brazing sheet including the core having the reduced thickness, the strength and the erosion resistance are not effectively improved only through the rough control of the density and/or the number of the (submicron-size) precipitates each having a circle-equivalent diameter of 100 nm or less as in the related art.

For the brazing sheet including the core having the reduced thickness, the strength necessary for a heat exchanger is greatly affected not only by the number density of the precipitates, or the dispersed particles, contained in the core aluminum alloy sheet but also by the composition of the dispersed particles, in other words, the solid-soluble states and/or precipitating states of main components in the aluminum alloy matrix, which has been failed to be recognized in the past. The number density contributes to an increase in strength due to dispersion hardening as an effect of the dispersed particles themselves. Specifically, as the number density increases, dislocation movement is more obstructed; hence, the effect of improving the strength is enhanced therethrough.

The composition of the dispersed particles to be precipitated (the solid-soluble state and/or precipitating state of the main component in a matrix) is particularly affected by the state of Si contained in the core. The Si contained in the core includes Si dissolved in a matrix, and particular Si precipitated as Al—Mn—Si based dispersed particles among the dispersed particles. As a smaller amount of Si is consumed by the dispersed particles, and as a larger amount of Si is dissolved, the strength necessary for the core (heat exchanger) increases. This is due to acceleration of solution strengthening after heating for brazing, and an increase in formation amount of aging precipitates of Mg, if added, and Si held at room temperature after heating for brazing.

Hence, a simple in number density of the fine dispersed particles increases the Al—Mn—Si based particles mainly contained in the dispersed particles, which reduces the amount of Si dissolved in the matrix, and thus the strength is rather reduced. Thus, in order to improve the strength, in addition to the control of the number density of the dispersed particles, it is important to control the composition of the dispersed particles to be precipitated into certain dispersed particles, in which the amount of Si is small (consumption of dissolved Si is small), rather than the Al—Mn—Si based dispersed particles in which the dissolved Si is actively consumed.

In a specific approach for varying the proportion of Si (a Mn/Si compositional ratio) in the Al—Mn—Si based dispersed particles, a ratio of formed α-AlMnSi phase particles, which has a small Si amount, i.e., a large Mn/Si compositional ratio, to formed β-AlMnSi phase particles, which has a large Si amount, i.e., a small Mn/Si compositional ratio, is controlled. Such control of the ratio of the formed α-AlMnSi phase particles ($Mn_3SiAl_{12}$) to the formed β-AlMnSi phase particles ($Mn_2SiA_{19}$) enables not only control of the number density of the dispersed particles but also control of the composition of the dispersed particles.

With the erosion resistance, recrystallized grains, which are formed during annealing for brazing, are shaped into a coarse pancake form by the effect of the dispersed particles to decrease diffusion of the brazing material to the core, so that erosion is suppressed. As the number density of the fine dispersed particles increases, the recrystallized grains subjected to annealing for brazing are more likely to be coarsened and shaped into the pancake form, and the erosion suppression effect is thus enhanced. As described above, however, a simple increase in number density of the dispersed particles non-negligibly enhances the effect of reducing the strength due to a decrease in amount of Si dissolved in the matrix as described above. This leads to a further need for control for achieving further improvement in strength and in erosion resistance.

On the basis of the various findings described hereinbefore, to achieve the object of the invention, the gist of the second technology of an aluminum-alloy clad sheet according to an embodiment of the invention includes an aluminum-alloy clad sheet to be formed into a heat exchanger by brazing, the aluminum-alloy clad sheet including at least a core aluminum alloy sheet and an aluminum-alloy sacrificial anti-corrosive material cladded with each other, wherein the aluminum-alloy clad sheet has an aluminum alloy composition containing, in percent by mass, 0.5 to 1.8% Mn, 0.4 to 1.5% Si, 0.05 to 1.2% Cu, and 0.03 to 0.3% Ti, containing Fe controlled to be 1.0% or less (including 0%), and containing one or more of 0.02 to 0.4% Cr, 0.02 to 0.4% Zr, and 0.02 to 0.4% Ni, with the remainder including Al and inevitable impurities, and the average number density of dispersed particles each having a circle-equivalent diameter of 0.5 μm or less is 10 to 25 per cubic micrometer, the dispersed particles being observed on a rolling plane in the central part in the thickness of the core aluminum alloy sheet, and among the dispersed particles each having the circle-equivalent diameter of 0.5 μm or less, Al—Mn—Si based dispersed particles have an average Mn/Si compositional ratio (in terms of percent by mass) of 2.50 or more, and among the Al—Mn—Si based dispersed particles each having the circle-equivalent diameter of 0.5 μm or less, Al—Mn—Si based dispersed particles each having a Mn/Si compositional ratio (in terms of percent by mass) of 2.50 or more have a volume fraction a, and Al—Mn—Si based dispersed particles each having a Mn/Si ratio (in terms of percent by mass) of less than 2.50 have a volume fraction b, and a ratio a/b is 0.50 or more.

The core aluminum alloy sheet of the clad sheet preferably further contains 0.2 to 1.0 mass % Zn. Furthermore, the core aluminum alloy sheet of the clad sheet is preferably further controlled in Mg content to be 0.8% or less (including 0%) in percent by mass. Moreover, the core aluminum alloy sheet of the clad sheet preferably has a small thickness of less than 0.17 mm. Moreover, the clad sheet preferably has a small thickness of less than 0.2 mm.

Moreover, the aluminum-alloy clad sheet preferably has a structure in each of the case where the aluminum-alloy clad sheet is subjected to heating corresponding to brazing, and the case where the aluminum-alloy clad sheet is formed into a heat exchanger by brazing, wherein dispersed particles each having a circle-equivalent diameter of 0.5 μm or less, the dispersed particles being observed in the central part in the thickness of the core aluminum alloy sheet, has an average number density of 5 to 20 per cubic micrometer, and among the dispersed particles each having the circle-equivalent diameter of 0.5 μm or less, Al—Mn—Si based dispersed particles have an average Mn/Si compositional ratio (in terms of percent by mass) of 2.50 or more, and among the Al—Mn—Si based dispersed particles each having the circle-equivalent diameter of 0.5 μm or less, Al—Mn—Si based dispersed particles each having a Mn/Si compositional ratio (in terms of percent by mass) of 2.50 or more have a volume fraction a, and Al—Mn—Si based dispersed particles each having a Mn/Si ratio (in terms of percent by mass) of less than 2.50 have a volume fraction b, and a ratio a/b is 0.50 or more.

Consequently, unlike in the related art, the second technology of the invention allows improvement in strength and erosion resistance of the core and in turn of the clad sheet through control of the composition of the mainly contained Al—Mn—Si based dispersed particles.

The rough control of the density or the number of the precipitates each having a diameter of 0.01 to 0.1 μm (10 to 100 nm) as in JP-A-2002-126894 does not singly allow the dispersed particles, which are controlled in composition as in the invention, to be contained (dispersed) in the structure at a preferable number density. The rough control therefore has no significant effect on the strength of the brazing sheet including the core having a relatively small thickness of less than 0.17 mm. Moreover, the rough control of the average number density of the precipitates within a range of an average circle-equivalent diameter of 0.1 to 0.5 μm (100 to 500 nm) as in JP-A-2009-191293 also does not allow the dispersed particles, which are controlled in composition as in the invention, to be contained (dispersed) in the structure at a preferable number density. The rough control therefore has no significant effect on the strength of the brazing sheet including the core having a relatively small thickness of less than 0.20 mm.

Through the above-described configuration, the invention can provide an aluminum-alloy clad sheet for an aluminum-alloy heat exchanger, which allows improvement in strength and erosion resistance even in a brazing sheet including a core having a reduced thickness.

DESCRIPTION OF THE PREFERRED EMBODIMENT

Figure 1:
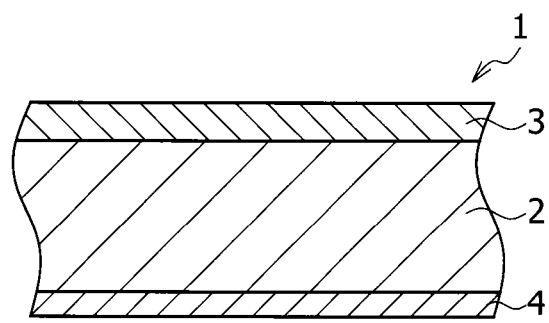
FIG. 1 is a sectional view illustrating a clad sheet of the invention.
Figure 2:
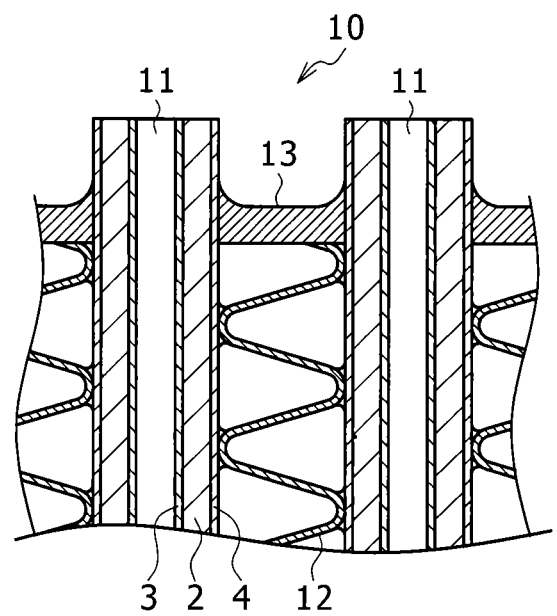
FIG. 2 is a sectional view illustrating an aluminum-alloy heat exchanger.
Figure 3:
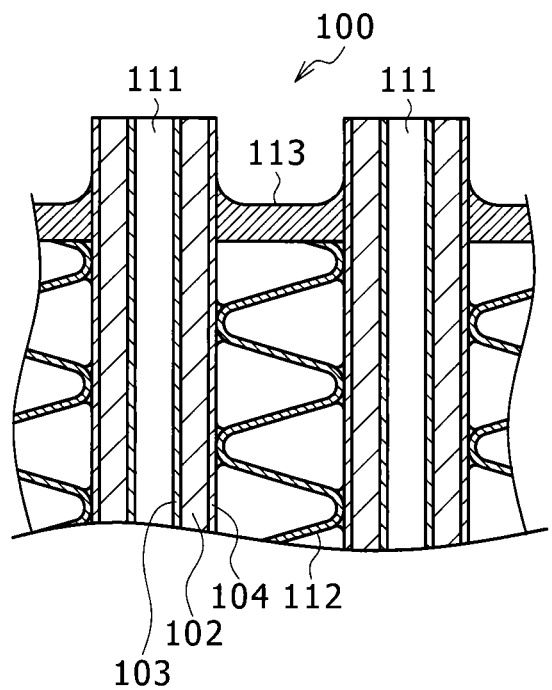
FIG. 3 is a sectional view illustrating a typical aluminum-alloy heat exchanger.
Figure 4:
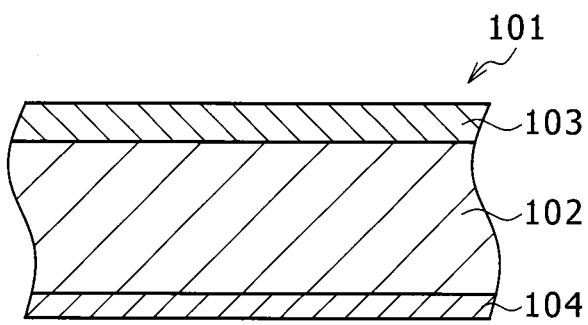
FIG. 4 is a sectional view illustrating a typical clad sheet such as a brazing sheet.

Preferred embodiments of a clad sheet, a clad sheet subjected to heating equivalent to brazing (thermal history), and a core aluminum alloy sheet of each clad sheet of the invention are now described with reference to FIGS. 1 and 2. FIG. 1 is a sectional view of an aluminum-alloy clad sheet for a heat exchanger of the invention. FIG. 2 is a relevant-part sectional view of a clad sheet (a radiator tube for a motor vehicle) of the invention using the clad sheet (an aluminum alloy tube for a heat exchanger) illustrated in FIG. 1. The basic configuration and structure in each of FIGS. 1 and 2 are the same as those in each of FIGS. 3 and 4 described above.
(Clad Sheet)

The clad sheet of the invention is first manufactured in a form of an aluminum-alloy clad sheet 1 illustrated in FIG. 1, and is then assembled into a heat exchanger. In the case where the clad sheet 1 is subjected to brazing, the clad sheet 1 is configured as a brazing sheet including a core aluminum alloy sheet 2 of which the one surface is cladded with an aluminum-alloy sacrificial anti-corrosion material (sheet) 3, and the other surface is cladded with an aluminum-alloy brazing material (sheet) 4.

The core aluminum alloy sheet 2 includes JIS 3000 series aluminum alloy having a characteristic structure or composition described later. In the brazing sheet, a side corresponding to the inside (a top side in FIG. 1), which is normally in contact with a coolant, of the core 2 is cladded with an aluminum alloy such as JIS 7000 series alloy having an Al—Zn composition as a sacrificial anti-corrosion material (a sacrificial material, lining material, or skin material) 3 described later. Furthermore, the outside (a bottom side in FIG. 1) of the core 2 is cladded with an aluminum-alloy brazing material 4 such as JIS 4000 series alloy having an Al—Si composition.

The clad sheet of the invention is a three-layered rolled clad material (sheet) with the core aluminum alloy sheet 2 as a central sheet as described above. The core aluminum alloy sheet has a reduced thickness of less than 0.17 mm, i.e., 0.08 to 0.16 mm, in order to reduce the weight of the heat exchanger as described above. Here, each of the brazing material and the sacrificial anti-corrosion material typically has a thickness of about 20 to 30 μm. The coverage of each material, however, unlimitedly varies depending on the thickness of a heat exchanger component to be used (specification for each application).

The thickness of the clad sheet 1 such as a brazing sheet (mainly the thickness of the core aluminum alloy sheet) is a main point for weight reduction of the heat exchanger as described above. Hence, the clad sheet preferably has a thickness of less than 0.2 mm, i.e., about 0.15 to 0.19 mm, and the core preferably has a thickness of less than 0.17 mm, i.e., about 0.08 to 0.16 mm.

With the brazing sheet, the sacrificial anti-corrosion material (sheet) and the brazing material (sheet) are laminated on the respective sides of the core aluminum alloy sheet (ingot), and such a laminate is in sequence subjected to hot rolling, cold rolling, process annealing, and cold rolling to produce a sheet including an H-14 refined material, for example. In this operation, the laminate may be subjected to homogenization heat treatment before the hot rolling.
(Brazing Material Alloy)

A brazing material alloy 4 to be laminated on the core aluminum alloy sheet 2 includes known aluminum alloys for brazing material such as generally used 4000-series Al—Si-based alloy brazing materials, such as JIS 4043, 4045, and 4047. The brazing material alloy is configured as a brazing sheet having one surface cladded with the aluminum-alloy sacrificial anti-corrosion material (sheet) 3, and the other surface cladded with an aluminum-alloy brazing material (sheet) 4.
(Sacrificial Anti-Corrosion Material)

The sacrificial anti-corrosion material alloy 3 to be laminated onto the core aluminum alloy sheet 2 may include known aluminum alloy containing Zn for a sacrificial anti-corrosion material, such as generally used 7000-series aluminum alloy materials, for example, JIS 7072 having a composition of Al-1 mass % Zn. Such a sacrificial anti-corrosion material is indispensable for a heat exchanger for a motor vehicle including cooling water in the inside of a tube. Specifically, the sacrificial anti-corrosion material is indispensable to prevent corrosion, or ensure corrosion resistance, of the inside of the tube including the cooling water.
(Heat Exchanger)

The aluminum-alloy clad sheet 1 such as the brazing sheet is bent in a width direction by, for example, forming rolls to be formed into a flat tube shape such that the skin material 3 is disposed on the inside of the tube, and is then formed into a tube by resistance welding, for example. In other words, a flat tube (clad component) 11 forming a fluid path illustrated in FIG. 2 is formed.

Such a flat tube (clad component) 11 is formed (assembled) into a heat exchanger such as a radiator 10 illustrated in FIG. 2 together with other components such as a corrugated radiating fin 12 and a header 13 by brazing. The integrated portion of the tube (clad component) 11 and the radiating fin 12 may be referred to as core of the heat exchanger. In the brazing, the components are heated to high temperature of 585 to 620° C., preferably 590 to 600° C., which is equal to or higher than the solidus temperature of the brazing material 4. As the brazing technique, flux brazing or Nocolok brazing using a noncorrosive flux is generally used.

In the heat exchanger illustrated in FIG. 2, the ends of the flat tube (clad component) 11 are each opened to a space formed by the header 13 and an undepicted tank. A hot coolant is fed from a space on a first tank side to a space on a second tank side through the flat tube 11, during which the coolant is cooled through heat exchange along the portions of the tube 11 and the radiating fins 12, and the cooled coolant is recirculated.

The structure of the core aluminum alloy sheet of the first technology of the invention is now described.
(Structure of Core Aluminum Alloy Sheet of First Technology)

The core aluminum alloy sheet of the clad sheet (before or after heating equivalent to brazing) has a composition of JIS 3000 series aluminum alloy. To improve the strength and the erosion resistance of the core aluminum alloy sheet, the first technology of the invention specifies average crystal grain size in a rolling direction in a longitudinal section along the rolling direction of the core aluminum alloy sheet (only of the clad sheet subjected to the heating equivalent to brazing), and specifies grain size distribution of precipitates (fine dispersed particles) each having a circle-equivalent diameter of 100 nm or less, which are observed by a transmission electron microscope (TEM) at 10,000 power on a rolling plane in the central part in the thickness of the core aluminum alloy sheet.

(Crystal Grain)

If the average crystal grain size of the core aluminum alloy sheet of the clad sheet subjected to the heating equivalent to brazing or a raw-material clad sheet before being assembled (being subjected to a thermal history) is reduced, the erosion resistance of the sheet is degraded. Hence, the core aluminum alloy sheet of the clad sheet subjected to heating equivalent to brazing is allowed to have an average crystal grain size coarsened to 100 µm or more in a rolling direction in a longitudinal section along the rolling direction. To achieve such coarsening of the average crystal grain size of the core aluminum alloy sheet of the clad sheet subjected to heating equivalent to brazing, it will be appreciated that the average crystal grain size of the core aluminum alloy sheet of the raw-material clad sheet must be beforehand adjusted to be 70 µm or more, preferably 100 µm or more. Even if the average crystal grain size of the core aluminum alloy sheet of the raw-material clad sheet is regulated, however, the average crystal grain size of the clad sheet subjected to heating equivalent to brazing varies (increases) depending on a heating condition of brazing or other treatment during production of the heat exchanger. As a result, even if the average crystal grain size of the core aluminum alloy sheet is regulated in a stage of the raw-material clad sheet, the average crystal grain size may increase beyond the regulated size depending on the heating condition. Thus, the average crystal grain size is not regulated in the stage of the raw-material clad sheet.

The crystal grain size described herein refers to crystal grain size in a rolling direction in a longitudinal section along the rolling direction (a section of the sheet cut along the rolling direction). The crystal grain size is observed as follows. That is, the longitudinal section along the rolling direction of the core aluminum alloy sheet (extracted sample) of the raw-material clad sheet or the clad sheet subjected to heating equivalent to brazing is pretreated through mechanical polishing or electrolytic etching, and the longitudinal section is then observed using a light microscope of 50 magnifications. Here, the crystal grain size is determined by a line intercept method in which a straight line is drawn in the rolling direction, and the length of an intercept of each crystal grain located on the straight line is measured as individual crystal grain size. This measurement is performed at ten appropriate places, and average crystal grain size is calculated. In this measurement, while the length of one measurement line is 0.5 mm or more, three measurement lines are set in each viewing field, and five viewing fields are observed in each measurement place. The average crystal grain sizes sequentially determined for every measurement line are sequentially averaged for every one viewing field (three measurement lines), for every five viewing fields in one measurement place, and for every ten measurement points to determine the average crystal grain size described herein.

(Precipitates)

In the case where the core aluminum alloy sheet is heated for brazing and is then assembled into (incorporated in) the clad sheet in a form of, for example, the brazing sheet, the core aluminum alloy sheet is inevitably heated at about 600° C. during brazing. Even if the core aluminum alloy sheet is subjected to such a heating history, the above-described chemical composition specified in the invention does not vary. The average number density of the precipitates to be specified in the invention, however, decreases in the clad sheet subjected to the heating equivalent to brazing compared with in the raw-material clad sheet due to solid solution and/or coarsening.

In order to improve the strength and the erosion resistance of the core (sheet), the first technology of the invention specifies the grain size distribution of the submicron-level precipitates (fine dispersed particles), each having the circle-equivalent diameter of 100 nm or less, in the core aluminum alloy sheet of the raw-material clad sheet or the clad sheet subjected to heating equivalent to brazing. Thus, in the invention, while the grain size distribution of the precipitates having the submicron-level size is controlled to be within a preferable range, the precipitates are actively contained (distributed) in large numbers in the structure, so that the strength and the erosion resistance are improved by the effect of such dispersed precipitates.

The densities of the precipitates at the various size levels (grain size) greatly affect the strength and the erosion resistance. The grain size range of such influential precipitates includes three levels: the precipitates each having a circle-equivalent diameter of 100 nm or less includes precipitates within a range of the circle-equivalent diameter of 10 nm to 100 nm, precipitates within a range of that of 10 nm to 60 nm, and precipitates within a range of that of 10 nm to 40 nm.

Here, the circle-equivalent diameter is a known definition generally used to specify "diameter" of each precipitate having an indefinite granular shape observed by TEM. The circle-equivalent diameter refers to a diameter (nm) of a circle having the same area as the projected area of a granular precipitate, which may be referred to as Heywood diameter or diameter by gravitational center. In the invention, the size of each precipitate and the grain size distribution of the precipitates are determined with the circle-equivalent diameter.

The first technology of the invention specifies the grain size distribution of the precipitates in the core in a form of the raw-material clad sheet (core) or a heat exchanger component subjected to the heating history at about 600° C. during brazing. In other words, unlike in the related art, the number of the submicron-level precipitates each having the circle-equivalent diameter of 100 nm or less is not controlled but the precipitates are conversely actively contained (dispersed) in large numbers. In this operation, in the first technology of the invention, the actively contained precipitates having the sub-micron-level size are grouped into three levels on the basis of sizes of the precipitates at a level of the circle-equivalent diameter of 100 nm or less, and the average number density in each level is regulated to control the grain size distribution of the precipitates.

The grain size distribution of the precipitates having the submicron-level size may be relatively finely specified in three or more levels. However, even if the grain size distribution is more finely specified in, for example, four or more levels, no significantly different correspondence is found in improvement in strength and erosion resistance compared with a case of the grain size distribution specified in three levels in the invention. Such specification is therefore not so much effective despite considerable effort. In contrast, the grain size distribution of the precipitates having the submicron-level size may be roughly specified in two levels. Such specification, however, is substantially not different from the technique of rough specification (one-level specification) of the number density of the precipitates each having a circle-equivalent diameter of 100 nm or less, which leads to a reduction in correspondence in improvement in strength and erosion resistance. Hence, the strength and the erosion resistance may not be improved by such specification.

In detail, the first technology of the invention specifies the density (average number density) of the precipitates within each of the ranges of the circle-equivalent diameter of 10 to 100 nm, 10 to 60 nm, and 10 to 40 nm. Specifically, the clad sheet subjected to heating equivalent to brazing has a structure where the precipitates each having a circle-equivalent diameter of 100 nm or less, which are observed by TEM at 10,000 power on a rolling plane in the central part in the thickness of the core aluminum alloy sheet of the clad sheet, has a grain size distribution, in which average number density of the precipitates within a range of the circle-equivalent diameter of 10 to 100 nm is 25 per cubic micrometer or more, average number density of the precipitates within a range of the circle-equivalent diameter of 10 to 60 nm is 10 per cubic micrometer or more, and average number density within a range of the circle-equivalent diameter of 10 to 40 nm of the precipitates is 1.2 per cubic micrometer or more.

If the average number density in each size range of the precipitates in the core aluminum alloy sheet of the clad sheet subjected to heating equivalent to brazing is below the lower limit of each specified range, the precipitates having the grain size distribution controlled within a preferable range as in the invention are not contained (dispersed) in appropriate numbers in the structure, and therefore the effect of improving the strength and the erosion resistance is not exhibited in the thin brazing sheet including the core having a reduced thickness of less than 0.17 mm.

In addition, the first technology of the invention specifies the grain size distribution and the average number density of the precipitates in the core aluminum alloy sheet in a stage of the raw-material clad sheet before being subjected to the heating history during brazing. Such specification is made to secure the grain size distribution and the average number density of the precipitates in the structure of the core aluminum alloy sheet of the clad sheet subjected to heating equivalent to brazing. In detail, the core aluminum alloy sheet in a stage of the raw-material clad sheet has a structure where the precipitates each having a circle-equivalent diameter of 100 nm or less, which are observed by TEM at 10,000 power on a rolling plane in the central part in the thickness of the core aluminum alloy sheet, has a grain size distribution, in which average number density of the precipitates within a range of the circle-equivalent diameter of 10 to 100 nm is 30 per cubic micrometer or more, average number density of the precipitates within a range of the circle-equivalent diameter of 10 to 60 nm is 15 per cubic micrometer or more, and average number density of the precipitates within a range of the circle-equivalent diameter of 10 to 40 nm is 1.5 per cubic micrometer or more.

If the average number density in each range of the precipitates in the core aluminum alloy sheet of the clad sheet in a stage of the raw-material clad sheet before being subjected to the heating history during brazing is below the lower limit of each specified range, the grain size distribution and the average number density of the precipitates in the structure of the core aluminum alloy sheet of the clad sheet subjected to heating equivalent to brazing cannot be secured. Hence, the precipitates having the grain size distribution controlled within the preferable range as in the invention are not contained (dispersed) in appropriate numbers in the structure of the core aluminum alloy sheet of the clad sheet subjected to heating equivalent to brazing, and therefore the effect of improving the strength and the erosion resistance is not exhibited in the thin brazing sheet including the core having a reduced thickness of less than 0.17 mm.

The precipitates (fine dispersed particles) include intermetallic compounds between the contained elements such as alloy elements including Si, Cu, Mn, and Ti or elements such as Fe and Mg, and intermetallic compounds between the contained elements and Al. The reason for specifying the precipitates with the size and the average number density thereof in the invention is that the size and the average number density of precipitates greatly affect the fatigue failure resistance for fatigue, where propagation (speed) of a crack is dominant, regardless of the constituent elements (composition). Hence, the first technology of the invention describes the precipitates (fine dispersed particles) as a general term of the intermetallic compounds having the above-described compositions, each of which can be identified based on the above-described size through structure observation regardless of the constituent elements (composition).

The size and the average number density of the precipitates are determined through observation of the structure on a rolling plane in the central part in the thickness in ten viewing fields by a transmission electron microscope (TEM) at 10,000 power. The observed structure is subjected to image analysis to determine the average number density (the number per cubic micrometer) of the precipitates in each of the ranges of the circle-equivalent diameter of 10 nm to 100 nm, 10 nm to 60 nm, and 10 nm to 40 nm.

(Control of Grain Size Distribution and Number Density of Precipitates)

The specified average number density of the precipitates (fine dispersed particles) is controlled through control of the number density of the precipitates, which are crystallized/precipitated in a casting process, during soaking (homogenization heat treatment). Although the number density of the precipitates is also controlled by a soaking condition in the related art, soaking temperature is set to 500° C. or more to control the precipitates to be decreased, and besides set to a relatively high temperature to prevent burning.

In contrast, in the first technology of the invention, the fine dispersed particles are precipitated in the structure of the core, and are actively dispersed to satisfy the specification of the grain size distribution of the fine dispersed particles through soaking at a relatively low temperature of 350 to 450° C. (hereinafter, appropriately referred to as low-temperature soaking). If the soaking temperature is less than 350° C., homogenization of ingot is failed. Conversely, if the soaking temperature is above 450° C., the number of the fine dispersed particles decreases so that the specification of the grain size distribution of the fine dispersed particles is not satisfied, leading to insufficient number of the fine dispersed particles for improving the strength and the erosion resistance.

If the homogenization of the ingot is insufficient and/or the hot-rolling start temperature of the ingot is inadequately low after the soaking at a relatively low temperature of 350 to 450° C., the ingot may be subjected to short soaking for reheating the ingot at 450° C. or more and less than 550° C. In this operation, the core ingot may be cladded with the sacrificial anti-corrosion material and the brazing material before the soaking at a relatively low temperature of 350 to 450° C. or the reheating at 450° C. or more and less than 550° C. In another possible operation, only the core ingot is subjected to the soaking at a relatively low temperature of 350 to 450° C., and the core ingot is then cladded with the sacrificial anti-corrosion material and the brazing material, and such a clad sheet is then reheated at 450° C. or more and less than 550° C. for short soaking (hereinafter, appropriately referred to as high-temperature soaking).

The soaked clad sheet is hot-rolled, and is then cold-rolled while being appropriately subjected to process annealing, and is then refined (heat-treated) into a raw-material clad sheet (brazing sheet) in the usual manner.

The composition of the core aluminum alloy of the first technology of the invention is now described.

(Composition of Aluminum Alloy of First Technology)

The composition of the aluminum alloy of the core aluminum alloy sheet configuring the clad sheet according to the first technology of the invention is now described. The core aluminum alloy sheet 2 according to the first technology of the invention includes the composition of the 3000 series aluminum alloy as described above. The core aluminum alloy sheet of the invention, however, is required to have not only the above-described structure of the invention but also certain properties such as formability, brazability or weldability, strength, and corrosion resistance as a heat exchanger component such as a tube and a header.

Thus, the core aluminum alloy sheet according to the first technology of the invention has an aluminum alloy composition that contains, in percent by mass, 0.5 to 1.8% Mn, 0.2 to 1.5% Si, 0.05 to 1.2% Cu, and 0.03 to 0.3% Ti, contains Fe controlled to be 1.0% or less, and contains one or more of 0.02 to 0.4% Cr, 0.02 to 0.4% Zr, and 0.02 to 0.4% Ni, with the remainder including Al and inevitable impurities. The percentage expressing the content of each element refers to mass percentage.

The aluminum alloy sheet may further contain 0.2 to 1.0% Zn in percent by mass. Furthermore, the aluminum alloy sheet is preferably controlled in Mg content to be 0.5 mass % or less.

The above-described Fe and Mg, and elements other than the listed elements are basically impurities. If, however, scrap materials of other aluminum alloys and/or low-purity Al metal are used as ingot materials in addition to high-purity Al metal from the viewpoint of recycling of aluminum alloy sheets, the unlisted elements may be mixed in. In addition, a reduction in each unlisted element to a detection limit or less inevitably increases cost, and therefore the unlisted elements may be contained in some degree. Hence, the unlisted elements may be contained within a range without disturbing the object and the advantageous effects of the invention. For example, the unlisted elements such as B may be contained up to 0.05%.

(Si: 0.2 to 1.5%)

Si increases the strength of the core aluminum alloy sheet through formation of an intermetallic compound with Fe. Si is therefore contained at least 0.2% to secure the strength necessary for the clad sheet or the clad sheet subjected to heating equivalent to brazing. In contrast, an excessive content of Si causes formation of coarse compounds in the core, and thus causes a reduction in size of grains recrystallized during heating and annealing for brazing, which accelerates diffusion of a brazing material into the core during brazing, resulting in degradation in brazability of the clad sheet during heating for brazing. In addition, the excessive content of Si accelerates diffusion of Si during heating for brazing, leading to degradation in corrosion resistance of the clad sheet or the clad sheet subjected to heating equivalent to brazing. Si is therefore contained up to 1.5%. Consequently, the content of Si is within a range of 0.2 to 1.5%.

(Cu: 0.05 to 1.2%)

Cu is dissolved in the aluminum alloy sheet, and improves the strength of the core aluminum alloy sheet. In addition, Cu causes the internal potential of the core to be noble, which improves the corrosion resistance of the core. Cu is therefore contained at least 0.05% to secure the strength necessary for the clad sheet or the clad sheet subjected to heating equivalent to brazing. In contrast, an excessive content of Cu accelerates precipitation of coarse Cu-based compounds in a crystal grain boundary during cooling after heating for brazing, which facilitates occurrence of intergranular corrosion, resulting in degradation in corrosion resistance. Cu is therefore contained up to 1.2%. Consequently, the content of Cu is within a range of 0.05 to 1.2%.

(Mn: 0.5 to 1.8%)

Mn is an element that distributes the specified fine dispersed particles in the aluminum alloy sheet, and thus increases the strength of the core aluminum alloy sheet without reducing the corrosion resistance thereof. Moreover, Mn improves the vibration fatigue resistance and the fatigue failure resistance. Consequently, Mn is contained at least 0.5% to secure the strength necessary for the clad sheet or the clad sheet subjected to heating equivalent to brazing, and to improve the fatigue failure resistance.

In contrast, an excessive content of Mn increases the number density of coarse compounds, which rather decreases the number density of precipitates at each specified grain size to below the specified limit, resulting in degradation in vibration fatigue resistance and fatigue failure resistance. In addition, such an increase in number density of the coarse compounds reduces the formability of the aluminum-alloy clad sheet that may be thus cracked during working such as assembling into a component form. Mn is therefore contained up to 1.8%. Consequently, the content of Mn is within a range of 0.5 to 1.8%.

(Ti: 0.03 to 0.3%)

Ti forms fine intermetallic compounds in the aluminum alloy sheet, and thus improves the corrosion resistance of the core aluminum alloy sheet. Ti is therefore contained at least 0.03% to secure the corrosion resistance necessary for the clad sheet or the clad sheet subjected to heating equivalent to brazing. In contrast, an excessive content of Ti increases the number density of coarse compounds, which degrades the formability of the aluminum-alloy clad sheet that may be thus cracked during working such as assembling into a component form. Ti is therefore contained up to 0.3%. Consequently, the content of Ti is within a range of 0.03 to 0.3%.

(Fe: 1.0% or less (including 0%))

Fe is inevitably contained as an impurity in the core aluminum alloy sheet as long as scraps are used as an ingot material for the aluminum alloy. Fe forms an intermetallic compound with Si and thus increases the strength of the core aluminum alloy sheet as described above, and improves the brazability of the core. An excessive content of Fe, however, causes formation of coarse compounds in the core, and thus causes a reduction in size of grains recrystallized during heating and annealing for brazing, which accelerates diffusion of a brazing material into the core during brazing, resulting in degradation in brazability of the clad sheet during heating for brazing. Consequently, the content of Fe is controlled to be 1.0% or less (including 0%).

(Mg: 0.5% or less)

Although Mg increases the strength of the core aluminum alloy sheet, an excessive content of Mg significantly degrades brazability of the core aluminum alloy sheet in Nocolok brazing using a fluoride flux or other brazing. Thus, the content of Mg is preferably controlled to be 0.5% or less for a heat exchanger formed at a brazing condition where brazability is degraded by Mg.

(One or More of Cr: 0.02 to 0.4%, Zr: 0.02 to 0.4%, and Ni: 0.02 to 0.4%)

Cr, Zr, and Ni are each an element to distribute the submicron-level precipitates (intermetallic compounds), each having the specified circle-equivalent diameter of 100 nm or less, in the aluminum alloy sheet. In particular, Zr most effectively distributes the fine dispersed particles in the aluminum alloy sheet in accordance with the specified grain size distribution. If the content of each of Cr, Zr, and Ni is less than the specified lower limit, the strength and the erosion resistance cannot be improved due to insufficient distribution of the fine dispersed particles. If the content of each of Cr, Zr, and Ni exceeds the specified upper limit, the strength, the erosion resistance, and the fatigue failure resistance are rather degraded through, for example, coarsening of the dispersed particles (precipitates).

(Zn: 0.2 to 1.0%)

Zn improves the vibration fatigue resistance of the core aluminum alloy sheet, and the fatigue resistance thereof to the fatigue where crack propagation is dominant. Zn, however, causes a metal matrix to have a base potential to be preferentially corroded. Hence, an increased content of Zn in the core reduces a difference in electric potential between the sacrificial anti-corrosion material provided as a preferential corrosion layer and the core, leading to degradation in corrosion resistance. Consequently, the content of Zn is preferably within a range of 0.2 to 1.0%.

The structure of the core aluminum alloy sheet of the second technology of the invention is now described.

(Structure of Core Aluminum Alloy Sheet of Second Technology)

The core aluminum alloy sheet of the clad sheet (before or after heating equivalent to brazing) has a composition of JIS 3000 series aluminum alloy. To improve the strength and the erosion resistance of the core aluminum alloy sheet, the second technology of the invention specifies the average number density and the composition of the dispersed particles in the structure of the core as a raw-material clad sheet before being brazed or being assembled into a heat exchanger (being subjected to a thermal history). Such specification is effective for improving the strength and the erosion resistance of the core of the heat exchanger as specification of the average number density and the composition of the dispersed particles in the structure of the core in each of the case where the aluminum-alloy clad sheet is subjected to heating equivalent to brazing, and a case where the aluminum-alloy clad sheet is formed into a heat exchanger by brazing.

In the case where the core aluminum alloy sheet is heated for brazing and is then assembled into (incorporated in) the heat exchanger in a form of the brazing sheet or the clad sheet, the core aluminum alloy sheet is inevitably heated at about 600° C. during brazing. Even if the core aluminum alloy sheet is subjected to such a heating history, the above-described chemical composition specified in the invention does not vary. The average number density of the dispersed particles to be specified in the invention, however, decreases in the clad sheet subjected to the heating equivalent to brazing compared with in the raw-material clad sheet due to solid solution and/or coarsening.

The composition of the dispersed particles specified in the second technology of the invention varies through such a heating history. Specifically, the average Mn/Si compositional ratio (in terms of percent by mass) of the Al—Mn—Si based dispersed particles, each of which has a circle-equivalent diameter of 0.5 μm or less, increases. In addition, among the Al—Mn—Si based dispersed particles each having a circle-equivalent diameter of 0.5 μm or less, Al—Mn—Si based dispersed particles having a Mn/Si compositional ratio (in terms of percent by mass) of 2.50 or more have a volume fraction a, and Al—Mn—Si based dispersed particles having a Mn/Si ratio (in terms of percent by mass) of less than 2.50 have a volume fraction b, and a ratio a/b also increases. The composition, however, less varies through the assumed heating for brazing or the assumed heating history corresponding to heating for brazing. Hence, the specification of the composition of the dispersed particles in the structure of the core according to the second technology of the invention is effective for securing the certain properties such as the strength and the erosion resistance of the core not only in a stage of the raw-material clad sheet before being brazed or being assembled into a heat exchanger (being subjected to a thermal history), but also in each of the case where the clad sheet is subjected to heating equivalent to brazing, and the case where the clad sheet is formed into a heat exchanger by brazing as described above.

(Average Number Density of Dispersed Particles)

To improve the strength and the erosion resistance of the core (sheet), the second technology of the invention specifies the average number density of the submicron-level dispersed particles (precipitates) each having the circle-equivalent diameter of 0.5 μm or less, which are observed by TEM at 50,000 power in the central part in the thickness of the core aluminum alloy sheet (on a rolling plane in the central part in the thickness of the core aluminum alloy sheet). Thus, in the invention, while the average number density of the dispersed particles having the submicron-level size is controlled to be within a preferable range, the dispersed particles are actively contained (distributed) in large numbers in the structure, so that the erosion resistance is improved by the effect of such dispersed precipitates. In addition, the strength is improved through a combination of the effect of the dispersed precipitates and the effect of control of the composition of the dispersed particles described later.

Here, the circle-equivalent diameter is a known definition generally used to specify "diameter" of each precipitate having an indefinite granular shape observed by TEM. The circle-equivalent diameter refers to a diameter (nm or μm) of a circle having the same area as the projected area of a granular precipitate, which may be referred to as Heywood diameter or diameter by gravitational center. In the invention, the size of each dispersed particle and the average number density of the dispersed particles are determined with the circle-equivalent diameter.

The second technology of the invention specifies the average number density of the dispersed particles in the core in a form of the raw-material clad sheet (core) or a heat exchanger component subjected to the heating history at about 600° C. during brazing.

In detail, in the second technology of the invention, the clad sheet subjected to heating equivalent to brazing has a structure where the dispersed particles each having a circle-equivalent diameter of 0.5 μm or less, which are observed by TEM at 50,000 power on a rolling plane in the central part in the thickness of the core aluminum alloy sheet of the clad sheet, have an average number density of 5 to 20 per cubic micrometer.

If the average number density of the dispersed particles in the core aluminum alloy sheet of the clad sheet subjected to heating equivalent to brazing is below the lower limit of the specified range, the effect of increasing the strength, which is due to dispersion strengthening caused by the dispersed particles, is not exhibited. Moreover, the effect of coarsening the recrystallized grains after annealing for brazing and/or the effect of providing the pancake-like crystal grains are not exhibited, and therefore the effect of reducing erosion is not exhibited. If the average number density of the dispersed particles in the core aluminum alloy sheet of the clad sheet subjected to heating equivalent to brazing is above the upper limit of the determined range, the average number density of the dispersed particles, which contribute to propagate a crack during fatigue failure, increases. As a result, propagation of a crack is accelerated, leading to a reduction in fatigue life (fatigue resistance) in the case where propagation of the fatigue failure is dominated.

In addition, the second technology of the invention specifies the average number density of the dispersed particles in the core aluminum alloy sheet in a stage of the raw-material clad sheet before being subjected to the heating history during brazing. Such specification is made to secure the average number density of the dispersed particles in the structure of the core aluminum alloy sheet of the clad sheet subjected to heating equivalent to brazing. In detail, the core aluminum alloy sheet in a stage of the raw-material clad sheet has a structure where the dispersed particles each having a circle-equivalent diameter of 0.5 µm or less, which are observed by TEM at 50,000 power on a rolling plane in the central part in the thickness of the core aluminum alloy sheet has an average number density of 10 to 25 per cubic micrometer.

If the average number density of the dispersed particles in the core aluminum alloy sheet of the clad sheet in a stage of the raw-material clad sheet before being subjected to the heating history during brazing is below the lower limit of the specified range, the average number density of the dispersed particles in the structure of the core aluminum alloy sheet of the clad sheet subjected to heating equivalent to brazing cannot be secured. Moreover, if the average number density of the dispersed particles in the core aluminum alloy sheet of the clad sheet in a stage of the raw-material clad sheet before being subjected to the heating history during brazing is above the upper limit of the specified range, the average number density of the dispersed particles in the structure of the core aluminum alloy sheet of the clad sheet subjected to heating equivalent to brazing cannot be secured. Hence, the dispersed particles having the average number density controlled within the preferable range as in the invention are not contained (dispersed) in appropriate numbers in the structure of the core aluminum alloy sheet of the clad sheet subjected to heating equivalent to brazing, and therefore the effect of improving the strength and the erosion resistance is not exhibited in the thin brazing sheet including the core having a reduced thickness of less than 0.17 mm.

The dispersed particles (precipitates) include intermetallic compounds between the contained elements such as Mn, Si, Cu, Ti, Fe, Cr, Zr, Ni, Zn, and Mg, or intermetallic compounds between the elements and Al. The reason for specifying the dispersed particles with the average number density thereof in the second technology of the invention is that the number density of the dispersed particles affects the strength and the erosion resistance regardless of the constituent elements (composition). Hence, the second technology of the invention describes the dispersed particles (precipitates) as a general term of the intermetallic compounds having the above-described compositions, each of which can be identified based on the above-described size through structure observation regardless of the constituent elements (composition).

(Composition of Dispersed Particles)

To improve the strength of the thin brazing sheet including the core (sheet) having a reduced thickness of less than 0.17 mm to satisfy the strength necessary for the heat exchanger, the second technology of the invention specifies the average number density of the submicron-level dispersed particles (precipitates) each having the circle-equivalent diameter of 0.5 µm or less in the central part in the thickness of the core aluminum alloy sheet. In addition, among the dispersed particles (precipitates) each having the circle-equivalent diameter of 0.5 µm or less, Al—Mn—Si based dispersed particles are specified to have an average Mn/Si compositional ratio (in terms of percent by mass) of 2.50 or more.

The thickness center of the core aluminum alloy sheet refers to the thickness center of a rolled surface of the core aluminum alloy sheet. The average number density of the submicron-level dispersed particles (precipitates) each having the circle-equivalent diameter of 0.5 µm or less can be observed and determined by TEM at 50,000 power. In addition, among the submicron-level dispersed particles (precipitates) each having the circle-equivalent diameter of 0.5 µm or less, Al—Mn—Si based dispersed particles can be subjected to observation and determination of an average Mn/Si compositional ratio (in terms of percent by mass) by means of the TEM-EDX at 50,000 power.

In addition, it is specified that, among the Al—Mn—Si based dispersed particles each having the circle-equivalent diameter of 0.5 µm or less, Al—Mn—Si based dispersed particles each having a Mn/Si compositional ratio (in terms of percent by mass) of 2.50 or more have a volume fraction a, and Al—Mn—Si based dispersed particles having a Mn/Si ratio (in terms of percent by mass) of less than 2.50 have a volume fraction b, and a ratio a/b is 0.50 or more.

As described above, with the thin brazing sheet including the core having the reduced thickness of less than 0.17 mm, the strength and the erosion resistance necessary for the heat exchanger are greatly affected by the average number density of the dispersed particles contained in the core aluminum alloy sheet, and furthermore greatly affected by the composition thereof.

(Average Mn/Si Compositional Ratio of Dispersed Particles)

Si is contained in the core as an alloy element effective for providing the strength and the erosion resistance necessary for the core (heat exchanger). Part of the Si is dissolved in the matrix, and the rest is precipitated as Al—Mn—Si based dispersed particles. If an increased amount of Si is consumed by the dispersed particles, and a smaller amount of Si is thus dissolved, Si does not contribute to secure the certain strength necessary for the core even if the content of Si is large. Hence, in the second technology of the invention, the amount of Si consumed by the dispersed particles is minimized to increase the amount of dissolved Si.

The average Mn/Si compositional ratio of the Al—Mn—Si based dispersed particles each having the circle-equivalent diameter of 0.5 µm or less is an index of the amount of effective Si dissolved in the structure of the core, i.e., an index of the amount of useless Si consumed by the dispersed particles. As the amount of useless Si consumed by the dispersed particles decreases (as the amount of dissolved Si increases), the amount of Si as the denominator decreases, and the value of the Mn/Si compositional ratio preferably increases.

To secure the strength and the erosion resistance necessary for the core, the second technology of the invention specifies the threshold of the average Mn/Si compositional ratio (in terms of percent by mass) of the Al—Mn—Si based dispersed particles, each of which has the circle-equivalent diameter being 0.5 µm or less but being barely observed by the TEM-EDX at 50,000 power, to be 2.50 or more. If the average Mn/Si compositional ratio (in terms of percent by mass) is less than 2.50, the amount of Si as the denominator, i.e., the amount of useless Si consumed by the dispersed particles increases, and the amount of dissolved Si thus decreases. As a result, even if the content of Si is large, the strength necessary for the core is not secured. The circle-equivalent diameter that is barely observed by the TEM-EDX at 50,000 power is about 10 nm. Hence, the circle-equivalent diameter of the Al—Mn—Si based dispersed particles is preferably 10 nm or more, and the circle-equivalent diameter of the Al—Mn—Si based dispersed particles is preferably specified within a range of 10 nm to 0.5 μm.

The α-AlMnSi phase particles, which have a small Si amount, i.e., a large Mn/Si compositional ratio, have a composition of $Mn_3SiAl_{12}$ as described above; hence, the Mn/Si compositional ratio approaches 3.0 with an increase in proportion of the α-AlMnSi phase particles. The compound, however, has a compositional range; hence, a measured Mn/Si compositional ratio of the compound has an upper limit of about 5.0.

(Volume Fraction of Al—Mn—Si Based Dispersed Particles)

As another point of the composition of the dispersed particles, in addition to securing the amount of dissolved Si, a ratio between the proportion of the α dispersed particles and the proportion of the β dispersed particles in the Al—Mn—Si based dispersed particles each having the circle-equivalent diameter of 0.5 μm or less is also significant to achieve the strength necessary for the core. Specifically, among the Al—Mn—Si based dispersed particles, the cubic, α dispersed particles having a large amount of Mn, i.e., having a high Mn/Si compositional ratio is increased, while the hexagonal, β dispersed particles having a small amount of Mn, i.e., having a low Mn/Si compositional ratio is decreased. This increases the content of dissolved S in the core, and the strength necessary for the core is thus secured.

Thus, in the second technology of the invention, the amount of dissolved Si is secured, and the α dispersed particles are increased while the β dispersed particles are decreased in the structure of the core, thus improving the strength of the core and in turn of the clad sheet. The proportion of each of the α and β dispersed particles, however, is difficult to be directly measured in an accurate and reproducible manner. Thus, the second technology of the invention indirectly determines the proportion (volume fraction) of each of the α and β dispersed particles based on the Mn/Si compositional ratio (in terms of percent by mass) of the individual Al—Mn—Si based dispersed particles having the circle-equivalent diameter of 0.5 μm or less, the Mn/Si compositional ratio being readily measured and correlating well with the proportion of each of the α and β dispersed particles.

Among the Al—Mn—Si based dispersed particles, each of which has the circle-equivalent diameter being 0.5 μm or less but being barely observed by the TEM-EDX at 50,000 power, 2.50 the Al—Mn—Si based dispersed particles having the Mn/Si compositional ratio (in terms of percent by mass) of 2.50 or more represent the cubic, a dispersed particles having a large amount of Mn, i.e., having a high Mn/Si compositional ratio, and the volume fraction a of the Al—Mn—Si based dispersed particles represents a volume fraction of the α dispersed particles. In addition, the Al—Mn—Si based dispersed particles having the Mn/Si compositional ratio (in terms of percent by mass) of less than 2.50 represent the hexagonal, β dispersed particles having a small amount of Mn, i.e., having a low Mn/Si compositional ratio, and the volume fraction b of the Al—Mn—Si based dispersed particles represents a volume fraction of the β dispersed particles.

In the second technology of the invention, the volume fraction ratio a/b between the two types of dispersed particles is specified to be 0.50 or more, so that the α dispersed particles increase while the β dispersed particles decrease in the structure of the core, thus improving the strength of the core and in turn of the clad sheet. If the ratio a/b is less than 0.50, the α dispersed particles decrease, while the β dispersed particles increase in the structure of the core, and thus improvement in strength and erosion resistance of the core and in turn of the clad sheet is not achieved.

Since the proportion of the α dispersed particles does not actually reach 100%, the ratio a/b has an upper limit of about 50.

Although the dispersed particles (precipitates) include intermetallic compounds between the contained elements such as Mn, Si, Cu, Ti, Fe, Cr, Zr, Ni, Zn, and Mg, or intermetallic compounds between the elements and Al, the composition of the dispersed particles in the invention relates to precipitates or intermetallic compounds mainly including Al, Mn, and Si. In other elements that may be contained in the core, Fe is largely contained in a form of a crystallized compound, and is thus less likely to be contained in the composition of the dispersed particles. In contrast, Cr, Zr, and Ni are likely to be contained in the composition of the dispersed particles. Cu and Zn are contained in the composition of the dispersed particles only through heat treatment at a low temperature, and are likely to be dissolved in the case of the manufacturing process of the clad sheet (core) having a long high-temperature range in the invention as described later. Hence, the second technology of the invention describes the composition of the dispersed particles as a general term of compositions of intermetallic compounds, each of which can be distinguished from other dispersed particles by the above-described size and composition determined through TEM observation of the structure.

Although Cr, Zr, and Ni are also likely to be contained in the Al—Mn—Si based dispersed particles, the added amount of each of Cr, Zr, and Ni is small compared with Mn in the second technology of the invention, and therefore the proportion of Si (the Mn/Si compositional ratio) of the Al—Mn—Si based dispersed particles is substantially determined by the added amount of each of Mn and Si and/or a manufacturing condition. Consequently, influence of each of the elements of Cr, Zr, and Ni is negligible.

The second technology of the invention adjusts the alloy composition of the core such that coarse Al—Mn—Si based dispersed particles, each having a diameter of more than 0.5 μm, are not formed in the structure of the core. Thus, even if such coarse dispersed particles are contained in the structure, the number of them is negligibly small, and therefore the coarse dispersed particles have substantially no influence on the strength and the erosion resistance of the core and in turn of the clad sheet.

(Measurement of Dispersed Particles)

The size, composition, and average number density of the dispersed particles are determined by FE-TEM (Transmission Electron Microscope) at 50,000 power and the accompanying energy dispersive X-ray spectroscopy (EDX or EDS).

Specifically, the thickness center of the core aluminum alloy sheet (the central part in the thickness of a rolling plane of an unbrazed raw-material alloy sheet) is mechanically polished into 0.05 to 0.1 mm, and is then electrolytically-etched into a sample for TEM observation. The dispersed particles in ten viewing fields of the sample are then observed by the FE-TEM. With the average number density of the dispersed particles, the thickness t of the sample for TEM observation is measured and calculated by a known contamination spot method, and the total volume of the sample in the observed viewing fields is determined based on the calculated results. In addition, the total number of the dispersed particles, each of which has the circle-equivalent diameter being 0.5 μm or less and being observable by the FE-TEM, is determined through image analysis using the photographs taken in the ten viewing fields. The total number of the dispersed particles is then divided by the total volume in the observed viewing fields to determine the average number density (per cubic micrometer) of the dispersed particles.

With the composition of the Al—Mn—Si based dispersed particles, the composition of the dispersed particles observed in the ten viewing fields by the FE-TEM are analyzed by the accompanying EDX so that the EDX determines whether that dispersed particles are the Al—Mn—Si based dispersed particles or other dispersed particles including substantially no Al, Mn, and Si.

In addition, the EDX also analyzes the individual identified Al—Mn—Si based dispersed particles, and determines whether or not the Mn/Si compositional ratio (in terms of percent by mass) of the particle is 2.50 or more. The volume fraction a in total (as a group) of the Al—Mn—Si based dispersed particles having the Mn/Si compositional ratio (in terms of percent by mass) of 2.50 or more, and the volume fraction b in total of the Al—Mn—Si based dispersed particles having the Mn/Si compositional ratio (in terms of percent by mass) of less than 2.50 are then calculated, and the volume fraction ratio a/b is then calculated to determine whether or not the a/b is 0.50 or more.

The volume fraction of the Al—Mn—Si based dispersed particles is determined as follows: the proportion (an area fraction) of the total area of the Al—Mn—Si based dispersed particles to the area of the viewing fields for TEM observation is calculated and converted into the volume fraction with the thickness t of the sample for TEM observation measured by a known contamination spot method. The volume fraction of the dispersed particles having the Mn/Si compositional ratio of 2.50 or more is determined as follows: only the Al—Mn—Si based dispersed particles that meet the specified range are extracted from the above-described Al—Mn—Si based dispersed particles to convert the above-described volume fraction into the volume fraction of only the extracted Al—Mn—Si based dispersed particles.

(Control of Dispersed Particles: Manufacturing of Clad Sheet)

A high-temperature range must be increased in a manufacturing process of the core (clad sheet) in order to control the dispersed particles within the range specified in the second technology of the invention. Specifically, in order to increase the dispersed particles having the Mn/Si compositional ratio of 2.50 or more, or the cubic, a Al—Mn—Si based dispersed particles having a large amount of Mn, i.e., having a high Mn/Si compositional ratio (to adjust the volume fraction ratio a/b as an index to be 0.50 or more), the core must be held for a long time in a high temperature range in which the dispersed particles are readily formed (precipitated).

Moreover, in order to control the average number density of the dispersed particles, each having the circle-equivalent diameter of 0.5 μm or less, to be 25 per cubic micrometer or less, the core must be held in a high temperature range rather than in a low temperature range in which a large number of dispersed particles are precipitated. In addition, in order to control the average number density of the dispersed particles, each having the circle-equivalent diameter of 0.5 μm or less, to be 10 per cubic micrometer or more, the upper limit of annealing temperature is necessary to prevent a significant reduction in average number density due to remarkable coarsening of the dispersed particles.

Thus, it is necessary to allocate sufficient time for precipitation of the desired dispersed particles, such as phase transition of the β Al—Mn—Si based dispersed particles, which are originally crystallized during casting, to the α Al—Mn—Si based dispersed particles, in the manufacturing process of the core (clad sheet), for example, by increasing a period of a high-temperature treatment step (high-temperature heating). It is also necessary to increase a period of a high-temperature treatment step (high-temperature heating) to control the upper limit of the number density of the dispersed particles, each having the circle-equivalent diameter of 0.5 μm or less, to be within the desired range.

In detail, the core must be subjected to soaking (homogenization heat treatment) for two hours or more, preferably four hours or more, at 450° C. or more, preferably 480° C. or more, and must be subjected to process annealing for one min or more at a high temperature of 450° C. or more, preferably 480° C. or more after hot rolling. In addition, the core may be subjected to process annealing at a high temperature of 450° C. or more, preferably 480° C. or more, during cold rolling. If the process annealing is not performed (is omitted) though the soaking is performed at 450° C. or more for a long time, or if any one of the soaking and the process annealing is performed at a low treatment (heating) temperature, time becomes short in the high temperature range for adequate precipitation of the dispersed particles having the average Mn/Si compositional ratio of or more and the a Al—Mn—Si based dispersed particles, and the dispersed particles are therefore likely to be failed to be controlled within the range specified in the second technology of the invention.

In addition, the upper limit of the heating temperature is necessary to control the lower limit of the number density of the dispersed particles, each having the circle-equivalent diameter of 0.5 μm or less, to be within the desired range. In detail, the core must be subjected to soaking (homogenization heat treatment) for 15 hours or less, preferably for 10 hours or less, at 620° C. or less, preferably 610° C. or less, and must be subjected to process annealing for four hours or less at a high temperature of 610° C. or less after hot rolling.

Although brazing is performed at a high temperature of 600° C., such one-time or short high temperature treatment by itself does not provide sufficient holding time in the high temperature range as in the common (existing) manufacturing process of the core (clad sheet), and the dispersed particles are therefore failed to be controlled to be within the range specified in the second technology of the invention. This inevitably results in a decrease in α dispersed particles.

The soaking may be performed in such a manner that only the aluminum alloy ingot of the core is soaked at a high temperature of preferably 480° C. or more and equal to or lower than the solidus temperature, and is then cladded with the sacrificial anti-corrosion material and the brazing material, and such a clad sheet is then soaked at a relatively low temperature of 350 to 450° C., or is soaked for a short time at a high temperature of 450° C. or more and less than 550° C.

Such a soaked clad sheet, which has been soaked at the above-described soaking temperature, is directly hot-rolled in a usual manner, or is hot-rolled in a usual manner after being cooled to a hot-rolling start temperature or after being cooled to room temperature and then reheated to a hot-rolling start temperature. The hot-rolled clad sheet is then subjected to the above-described process annealing, and is then cold-rolled into a desired thickness, and is then refined (heat-treated) into a raw-material clad sheet (brazing sheet).

(Crystal Grain)

As premises for the structure of the core of the second technology of the invention, if the average crystal grain size of the core aluminum alloy sheet of the clad sheet subjected to heating equivalent to brazing is reduced, the erosion resistance of the sheet is degraded. Hence, the core aluminum alloy sheet of the clad sheet subjected to heating equivalent to brazing has an average crystal grain size, which is preferably coarsened to 120 μm or more, more preferably 150 μm or more, in a rolling direction in a longitudinal section along the rolling direction. On the other hand, if the average crystal grain size excessively increases, the strength is reduced after brazing; hence, the average crystal grain size is preferably 250 μm or less, more preferably 200 μm or less.

Such coarsening of the core aluminum alloy sheet of the clad sheet subjected to heating equivalent to brazing is achieved through control of the average number density of the dispersed particles of the core aluminum alloy sheet, which is in a stage of the raw-material clad sheet before being subjected to the heating history during brazing, to be within the specified range. The structure of the core aluminum alloy sheet in the stage of the raw-material clad sheet may be a worked structure, in which the crystal grain size cannot be specified, without being limited to the recrystallized structure. In each case, it is found that the average crystal grain size of the core aluminum alloy sheet of the clad sheet subjected to heating equivalent to brazing, the average crystal grain size being determined depending on the behavior of recrystallization and grain growth during the heating equivalent to brazing, is greatly affected by the average crystal grain size of the dispersed particles of the core aluminum alloy sheet of the clad sheet before being subjected to the heating equivalent to brazing; hence, the average number density of the dispersed particles of the core aluminum alloy sheet in the stage of the raw-material clad sheet is not specified.

The crystal grain size described in the second technology of the invention refers to crystal grain size in a rolling direction in a longitudinal section along the rolling direction (a section of the sheet cut along the rolling direction). The crystal grain size is observed as follows. That is, the longitudinal section along the rolling direction of the core aluminum alloy sheet (extracted sample) of the raw-material clad sheet or the clad sheet subjected to heating equivalent to brazing is pretreated through mechanical polishing or electrolytic etching, and the longitudinal section is then observed using a light microscope of 50 magnifications. Here, the crystal grain size is determined by a line intercept method in which a straight line is drawn in the rolling direction, and the length of an intercept of each crystal grain located on the straight line is measured as individual crystal grain size. This measurement is performed at ten appropriate places, and average crystal grain size is calculated. In this measurement, while the length of one measurement line is 0.5 mm or more, three measurement lines are set in each viewing field, and five viewing fields are observed in each measurement place. The average crystal grain sizes sequentially determined for every measurement line are sequentially averaged for every one viewing field (three measurement lines), for every five viewing fields in one measurement place, and for every ten measurement places to determine the average crystal grain size described herein.

The composition of the core aluminum alloy of the second technology of the invention is now described.
(Composition of Aluminum Alloy of Second Technology)

The composition of the aluminum alloy of the core aluminum alloy sheet configuring the clad sheet according to the second technology of the invention is now described. The core aluminum alloy sheet 2 according to the second technology of the invention includes the composition of the 3000 series aluminum alloy as described above. The core aluminum alloy sheet of the invention, however, is required to have not only the above-described structure of the invention but also certain properties such as formability, brazability or weldability, strength, and corrosion resistance as a heat exchanger component such as a tube and a header.

Thus, the core aluminum alloy sheet according to the second technology of the invention has an aluminum alloy composition that contains, in percent by mass, 0.5 to 1.8% Mn, 0.4 to 1.5% Si, 0.05 to 1.2% Cu, and 0.03 to 0.3% Ti, contains Fe controlled to be 1.0% or less (including 0%), and contains one or more of 0.02 to 0.4% Cr, 0.02 to 0.4% Zr, and 0.02 to 0.4% Ni, with the remainder including Al and inevitable impurities. The percentage expressing the content of each element refers to mass percentage.

The aluminum alloy sheet may further contain 0.2 to 1.0% Zn in percent by mass. Furthermore, the aluminum alloy sheet is preferably controlled in Mg content to be 0.8% (including 0%) or less.

Elements other than the listed elements are basically impurities. If, however, scrap materials of other aluminum alloys and/or low-purity Al metal are used as ingot materials in addition to high-purity Al metal from the viewpoint of recycling of aluminum alloy sheets, the unlisted elements may be mixed in. In addition, a reduction in each unlisted element to a detection limit or less inevitably increases cost, and therefore the unlisted elements may be contained in some degree. Hence, the unlisted elements may be contained up to approximately the upper limit of the composition of the JIS 3000 series aluminum alloy within a range without disturbing the object and the advantageous effects of the invention.
(Si: 0.4 to 1.5%)

Si is dissolved in a matrix, and is effective for securing the strength necessary for the core (heat exchanger). A certain amount of Si, however, is consumed by the Al—Mn—Si based dispersed particles as described above; hence, Si is contained at least 0.4% to secure a certain amount of dissolved Si. In addition, Si increases strength of the core aluminum alloy sheet through formation of the Al—Mn—Si based dispersed particles. If the content of Si is less than 0.4%, these effects are not sufficiently exhibited. In contrast, if the content of Si is excessive, the melting point of the core decreases, and melt of the core occurs during brazing due to an increase in low melting-point phase. Si is therefore contained up to 1.5%. Consequently, the content of Si is within a range of 0.4 to 1.5%.
(Cu: 0.05 to 1.2%)

Cu is dissolved in the aluminum alloy sheet, and improves the strength of the core aluminum alloy sheet, and improves the corrosion resistance of the core aluminum alloy sheet in its region close to the brazing material. Cu is therefore contained at least 0.05% to secure the strength necessary for the clad sheet or the clad sheet subjected to heating equivalent to brazing. In contrast, an excessive content of Cu accelerates precipitation of coarse Cu-based compounds in a crystal grain boundary during cooling after heating for brazing, which facilitates occurrence of intergranular corrosion, resulting in degradation in corrosion resistance of the clad sheet or the clad sheet subjected to heating equivalent to brazing. Moreover, the excessive content of Cu leads to a reduction in melting point of the core, causing melt of the core during brazing. Cu is therefore contained up to 1.2%. Consequently, the content of Cu is within a range of 0.05 to 1.2%.
(Mn: 0.5 to 1.8%)

Mn is an element that distributes the specified fine dispersed particles in the aluminum alloy sheet, and thus increases the strength of the core aluminum alloy sheet through dispersion strengthening without reducing the corrosion resistance thereof. Consequently, Mn is contained at least 0.5% to secure the strength necessary for the clad sheet or the clad sheet subjected to heating equivalent to brazing.

In contrast, an excessive content of Mn increases the number density of coarse Al—Fe—(Mn)—(Si) based crystallized compounds, which degrades the formability of the aluminum-alloy clad sheet that may be thus cracked during working such as assembling into a component form. Mn is therefore contained up to 1.8%. Consequently, the content of Mn is within a range of 0.5 to 1.8%.

(Ti: 0.03 to 0.3%)

Ti forms fine intermetallic compounds in the aluminum alloy sheet, and thus improves the corrosion resistance of the core aluminum alloy sheet. Specifically, addition of Ti allows the fine intermetallic compounds to be precipitated in layers in the core aluminum alloy sheet, which suppresses advance of pitting corrosion in a depth direction, and allows the electric potential of the core to be shifted to a noble potential. In addition, Ti has a small diffusion rate in the aluminum alloy, and moves little during brazing; hence, addition of Ti is effective for electrochemically protecting against corrosion of the core while maintaining a potential difference between the core and the brazing material, or between the core and the sacrificial material. Ti is therefore contained at least 0.03% to secure the corrosion resistance necessary for the clad sheet or the clad sheet subjected to heating equivalent to brazing.

In contrast, an excessive content of Ti causes formation of coarse Al—Ti based compounds, which degrades the formability of the aluminum-alloy clad sheet that may be thus cracked during working such as assembling into a component form. Ti is therefore contained up to 0.3%. Consequently, the content of Ti is within a range of 0.03 to 0.3%.

(Fe: 1.0% or Less (Including 0%))

Fe is inevitably contained as an impurity in the core aluminum alloy sheet as long as scraps are used as an ingot material for the aluminum alloy. Fe forms intermetallic compounds with Si and thus increases the strength of the core aluminum alloy sheet as described above, and improves the brazability of the core. An excessive content of Fe, however, causes significant degradation in self-corrosion resistance of the core aluminum alloy sheet. Moreover, the excessive content of Fe causes formation of coarse compounds, which causes degradation in formability of the aluminum-alloy clad sheet that may be thus cracked during working such as assembling into a component form. Consequently, the content of Fe is controlled to be 1.0% or less (including 0%).

(Mg: 0.8% or Less (Including 0%))

Although Mg increases the strength of the core aluminum alloy sheet, an excessive content of Mg increases influence of Mg diffusion on the brazing material, which accelerates a reaction of a fluoride based flux applied on the surface of the brazing material with Mg in the brazing material during brazing, resulting in significant degradation in brazability in Nocolok brazing using a fluoride flux or other brazing. Thus, the content of Mg is preferably controlled to be 0.8% or less for a heat exchanger formed at a brazing condition where brazability is degraded by Mg.

(One or More of Cr: 0.02 to 0.4%, Zr: 0.02 to 0.4%, and Ni: 0.02 to 0.4%)

Cr, Zr, and Ni are each an element to distribute the submicron-level precipitates (intermetallic compounds), each having the specified circle-equivalent diameter of 100 nm or less, in the aluminum alloy sheet, and one or more of them is contained. In particular, Zr most effectively distributes the fine dispersed particles in the aluminum alloy sheet in accordance with the specified grain size distribution. If the content of each of Cr, Zr, and Ni is less than the specified lower limit, the fine dispersed particles cannot be sufficiently distributed, and therefore the effect of improving the strength due to dispersion strengthening is not exhibited. If the content of each of Cr, Zr, and Ni exceeds the specified upper limit, coarse compounds are formed, which degrades the formability of the aluminum-alloy clad sheet that may be thus cracked during working such as assembling into a component form. Consequently, if the elements are contained, Cr is within a range of 0.02 to 0.4%, Zr is within a range of 0.02 to 0.4%, and Ni is within a range of 0.02 to 0.4%.

(Zn: 0.2 to 1.0%)

Zn increases the strength of the core aluminum alloy sheet through solution strengthening. Zn, however, causes a metal matrix to have a base potential to be preferentially corroded. Hence, an increased content of Zn in the core reduces a difference in electric potential between the sacrificial anti-corrosion material provided as a preferential corrosion layer and the core, leading to degradation in corrosion resistance. Consequently, Zn is selectively contained within a range of 0.2 to 1.0% to exhibit the effect of Zn.

EXAMPLES

The invention is now more specifically described with Examples. Examples and comparative examples of the aluminum-alloy clad sheet of the first technology are described, and Examples and comparative examples of the aluminum-alloy clad sheet of the second technology are then described.
(Examples and Comparative Examples of Aluminum-Alloy Clad Sheet of First Technology)

Clad sheets (brazing sheets) 1 including 3000-series aluminum alloy cores 2 having compositions A1 to T1 shown in Table 1 were produced, and structures of the cores 2 were investigated. Each of the clad sheets 1 was then subjected to heating equivalent to brazing, i.e., heated at 600° C. for 3 min as simulated brazing, and was then cooled at an average cooling rate of 100° C./min, and the structure of the core of the clad sheet subjected to the heating equivalent to brazing was investigated. Table 2 shows results of the investigations. In addition, mechanical properties and erosion resistance of each of the clad sheets subjected to the heating equivalent to brazing were evaluated. Table 2 shows results of the evaluation.

(Production of Clad Sheet)

The clad sheets were produced as follows. The 3000-series aluminum alloy compositions A1 to T1 shown in Table 1 were melted and casted to produce aluminum-alloy core ingots. In each Example of the invention, only the core ingot was soaked, in which the ingot was in common held for 10 hours at a low temperature under the temperature condition shown in Table 2. The core ingot was then cladded with a sacrificial anti-corrosion material and a brazing material, and was then reheated as second soaking at a higher temperature (for three hours in common) to control the grain size distribution of precipitates. In Table 2, "first soaking temperature" is soaking temperature only for the core ingot, and "second soaking temperature" is soaking temperature for the clad sheet (clad ingot).

In the cladding of the core ingot 2, one surface of the core ingot 2 was cladded with a JIS 7072 aluminum alloy sheet having a composition of Al-1 mass % Zn as the sacrificial anti-corrosion material, and the other surface thereof was cladded with a JIS 4045 aluminum alloy sheet having a composition of Al-10 mass % Si as the brazing material. The clad ingot was then hot-rolled at the second soaking temperature. In this hot rolling, time from the end of the second soaking to start of the hot rolling was constant, i.e., 30 min. The core aluminum alloy sheet was then formed into a clad sheet (brazing sheet) as an H24 refined material while being reduced in thickness to less than 0.17 mm, i.e., 0.11 mm through an appropriate combination of cold rolling and finish annealing. In each Example, the clad sheet (brazing sheet) in common had a core aluminum alloy sheet having a thickness of 0.11 mm, and had the brazing material and the sacrificial anti-corrosion material laminated on the respective surfaces of the core, each material having a thickness within a range of 25 to 35 μm.

(Structure)

The above-described measurement methods were used to observe the structure of the core of the clad sheet as the cold-rolled clad sheet, and observe the structure of the core of the heated clad sheet, so that average crystal grain size (μm) in a rolling direction in a longitudinal section along the rolling direction, and average number density (number/μm$^3$) of the precipitates having the circle-equivalent diameter within each specified range, which were observed by TEM at 10,000 power on a rolling plane in the central part in the thickness, were determined. Table 2 shows results of the determinations. With the average number density of the precipitates, thickness of each sample at an observed site was obtained with a fringe of equal thickness, and the number of precipitates per unit volume of the sample was determined. Although the average crystal grain size of the core aluminum alloy sheet of the clad sheet as the raw material, which is not subjected to the heating equivalent to brazing, is not shown in Table 2, the material refined through rolling has a worked structure in which the crystal grains are difficult to be evaluated by a light microscope, and therefore the average crystal grain size is not evaluated herein.

(Mechanical Properties)

The heated clad sheets were each subjected to a tensile test to measure the tensile strength (MPa) thereof. Table 2 shows results of the measurements. In the test condition, a JIS Z2201 No. 5 test piece (25 mm×50 mm gage length (GL)×thickness) in a direction perpendicular to the rolling direction was extracted from each clad sheet for the tensile test. The tensile test was conducted at normal temperature, or 20° C., according to JIS Z2241 (1980) (Method of tensile test for metallic materials). The tensile test was conducted at a constant cross head speed of 5 mm/min till the break of the test piece.

(Erosion Resistance)

The erosion resistance was evaluated through measurement of erosion depth. Each of the produced brazing sheets was rolled by 10%, and was then held at 600° C. for 5 min or more in an atmosphere of an oxygen concentration of 200 ppm or less to produce a brazed test piece. A section parallel to the rolling direction of each brazed brazing sheet was observed by a light microscope for measurement of penetration depth, i.e., erosion depth (μm), of the brazing material into the core. The observation magnification of the light microscope is 100. A grain boundary on a brazing material side in a viewing field may be eroded into the core in some regions. In such regions, depths of the erosion were measured and averaged. This measurement was repeated in ten viewing fields, and an average of the averaged depths was determined as the erosion depth.

As shown in Tables 1 and 2, Examples 1 to 13 of the invention are each manufactured through low-temperature soaking and high-temperature soaking within preferable soaking condition ranges while the core aluminum alloy sheet (ingot) has a composition within the composition range of the invention (Example 3 of the invention is subjected to only the low-temperature soaking). Thus, as shown in Table 2, the core aluminum alloy sheet of each clad sheet (brazing sheet) has a structure where the grain size distribution of the precipitates to be specified is within the specified range. Specifically, precipitates each having a circle-equivalent diameter of 100 nm or less, which are observed by TEM at 10,000 power on the rolling plane in the central part in the thickness of the core aluminum alloy sheet, have a grain size distribution, in which average number density of the precipitates within a range of the circle-equivalent diameter of 10 to 100 nm is 30 per cubic micrometer or more, average number density of the precipitates within a range of the circle-equivalent diameter of 10 to 60 nm is 15 per cubic micrometer or more, and average number density of the precipitates within a range of the circle-equivalent diameter of 10 to 40 nm is 1.5 per cubic micrometer or more. In addition, the core aluminum alloy sheet of the clad sheet subjected to the heating equivalent to brazing has an average crystal grain size coarsened to 100 μm or more in a rolling direction in a longitudinal section along the rolling direction.

As a result, in each of the Examples 1 to 13, even if the thickness of the core is reduced to less than 0.17 mm, i.e., 0.11 mm, the clad sheet subjected to the heating equivalent to brazing has an excellent erosion resistance, i.e., shows the erosion depth of 50 μm or less, while having a predetermined strength. In other words, a brazing sheet reduced in thickness may also achieve improvement in strength and erosion resistance.

Among the Examples of the invention, however, the Examples 11 and 12 including exemplary alloys J1 and K1 in Table 1, in which the core aluminum alloy sheets (ingots) have relatively high Mg contents of 0.5% and 0.8%, respectively, each exhibit a significant reduction in brazability in the case of employing Nocolok brazing using a fluoride flux, which however is not shown in the test results. Thus, the content of Mg is preferably controlled to be 0.5% or less for a heat exchanger formed at a brazing condition where brazability is degraded by Mg, as described above.

In contrast, in each of the comparative examples 14 to 16, although the core aluminum alloy sheet (ingot) has a composition (B1) within the composition range of the invention, the soaking condition of the low-temperature soaking is out of the preferable range. Thus, as shown in Table 2, the core aluminum alloy sheet of each clad sheet does not satisfy the grain size distribution of the precipitates specified in the invention, i.e., has a grain size distribution, in which average number density of the precipitates within the range of 10 to 100 nm is less than 30 per cubic micrometer, average number density of the precipitates within the range of 10 to 60 nm is less than 15 per cubic micrometer, or average number density of the precipitates within the range of 10 to 40 nm is less than 1.5 per cubic micrometer. In addition, the core aluminum alloy sheet of the clad sheet subjected to the heating equivalent to brazing has an average crystal grain size that is not coarsened to 100 μm or more in a rolling direction in a longitudinal section along the rolling direction. As a result, as shown in Table 2, the clad sheet subjected to the heating equivalent to brazing in each of the comparative examples 14 to 16 has low strength, and has inferior erosion resistance, i.e., shows the erosion depth of 50 μm or more.

In the comparative examples 14 and 16, although the second high-temperature soaking is performed at an appropriate temperature, the first low-temperature soaking is not performed. Moreover, in the comparative example 16, the second high-temperature soaking is performed at the same temperature level as that in the related art, i.e., at an excessively high temperature. In the comparative example 15, the first low-temperature soaking is performed at an excessively low temperature, or 300° C.

In the comparative examples 17 to 24, although the clad sheets are each produced at a preferred soaking condition (except for the comparative example 23), the core aluminum alloy sheets (ingots) have compositions M1, N1, O1, P1, Q1, R1, S1, and T1 (Table 1) out of the composition range of the invention. Thus, each core aluminum alloy sheet also does not satisfy the grain size distribution of the precipitates specified in the invention, i.e., has a grain size distribution, in which average number density of the precipitates within the range of 10 to 100 nm is less than 30 per cubic micrometer, average number density of the precipitates within the range of 10 to 60 nm is less than 15 per cubic micrometer, or average number density of the precipitates within the range of 10 to 40 nm is less than 1.5 per cubic micrometer. In addition, the core aluminum alloy sheet of the clad sheet subjected to the heating equivalent to brazing has an average crystal grain size that is not coarsened to 100 μm or more in a rolling direction in a longitudinal section along the rolling direction. As a result, as shown in Table 2, the clad sheet subjected to the heating equivalent to brazing in each of the comparative examples 17 to 24 has low strength and inferior erosion resistance.

In the comparative example 17, the content of Si is excessively low as indicated by the alloy symbol M1 in Table 1.

In the comparative example 18, the content of Cu is excessively low as indicated by the alloy symbol N1 in Table 1.

In the comparative example 19, the content of Mn is excessively low as indicated by the alloy symbol O1 in Table 1.

In the comparative example 20, the content of Fe is excessively high as indicated by the alloy symbol P1 in Table 1.

In the comparative example 21, the content of Ti is excessively low as indicated by the alloy symbol Q1 in Table 1.

In the comparative examples 22 and 23, Cr, Zr, and Ni are not contained as indicated by the alloy symbols R1 and S1, respectively, in Table 1. In the comparative example 23, the temperature of the first low-temperature soaking is excessively high, i.e., 480° C.

In the comparative example 24, the content of Zn is excessively high as indicated by the alloy symbol T1 in Table 1.

Consequently, the results of the above Examples support the critical meaning and advantageous effects of the points of the first technology of the invention for improving the mechanical properties of the clad sheet for a heat exchanger or of the clad sheet subjected to heating equivalent to brazing.

TABLE 1

| Group | Symbol | Composition of core Al alloy sheet (percent by mass, the remainder is Al) | | | | | | | | | |
|---|---|---|---|---|---|---|---|---|---|---|---|
| | | Si | Fe | Cu | Mn | Mg | Cr | Zr | Ni | Zn | Ti |
| Example of invention | A1 | 0.2 | 0.1 | 0.7 | 1.1 | — | — | 0.02 | — | — | 0.1 |
| | B1 | 0.8 | 0.1 | 0.7 | 1.1 | — | — | 0.07 | — | — | 0.1 |
| | C1 | 0.8 | 0.1 | 0.7 | 1.1 | 0.3 | — | 0.15 | — | — | 0.1 |
| | D1 | 1.2 | 0.1 | 0.7 | 1.1 | — | — | 0.3 | — | — | 0.1 |
| | E1 | 1.0 | 0.1 | 0.05 | 1.1 | — | 0.03 | 0.4 | — | — | 0.1 |
| | F1 | 0.8 | 0.1 | 0.5 | 1.1 | 0.1 | 0.07 | 0.15 | — | — | 0.1 |
| | G1 | 0.8 | 0.1 | 1.1 | 1.2 | — | 0.15 | — | — | — | 0.1 |
| | H1 | 1.0 | 1.0 | 1.2 | 0.5 | — | 0.4 | 0.15 | — | — | 0.1 |
| | I1 | 1.5 | 0.1 | 0.7 | 0.8 | — | 0.15 | 0.3 | 0.03 | — | 0.1 |
| | J1 | 0.8 | 0.1 | 0.7 | 1.8 | 0.8 | — | — | 0.07 | 0.2 | 0.1 |
| | K1 | 0.8 | 0.1 | 0.7 | 1.1 | 0.5 | — | 0.15 | 0.15 | — | 0.03 |
| | L1 | 0.8 | 0.1 | 0.7 | 1.1 | — | 0.15 | — | 0.4 | 0.6 | 0.3 |
| Comparative example | M1 | 0.1 | 0.1 | 0.7 | 1.1 | — | — | 0.15 | — | — | 0.1 |
| | N1 | 0.8 | 0.1 | — | 1.1 | — | — | 0.15 | — | — | 0.1 |
| | O1 | 0.8 | 0.1 | 0.7 | 0.4 | — | — | 0.15 | — | — | 0.1 |
| | P1 | 0.8 | 1.2 | 0.7 | 1.1 | — | — | 0.15 | — | — | 0.1 |
| | Q1 | 0.8 | 0.1 | 0.7 | 1.1 | — | — | 0.15 | — | — | — |
| | R1 | 0.8 | 0.1 | 0.7 | 0.8 | — | — | — | — | — | 0.1 |
| | S1 | 1.2 | 0.1 | 0.7 | 1.1 | — | — | — | — | — | 0.1 |
| | T1 | 0.8 | 0.1 | 0.7 | 1.1 | — | 0.15 | 0.15 | 0.3 | 1.2 | 0.1 |

*In description of the content, *—*represents the content equal to or lower than the detection limit.

TABLE 2

| | | | First low-temperature soaking temperature (only for core ingot) °C | Second high-temperature soaking temperature (for clad ingot) °C | Al alloy clad sheet | | | Al alloy clad sheet subjected to heating equivalent to brazing | | | | | |
|---|---|---|---|---|---|---|---|---|---|---|---|---|---|
| | | | | | Core Al alloy sheet | | | Core Al alloy sheet | | | | | |
| Group | No. | Symbol of core composition in Table 1 | | | Circle-equivalent diameter 10 to 100 nm Average number density of precipitates Number/μm³ | Circle-equivalent diameter 10 to 60 nm Average number densely of precipitates Number/μm³ | Circle-equivalent diameter 10 to 40 nm Average number density of precipitates Number/μm³ | Circle-equivalent diameter 10 to 100 nm Average number density of precipitates Number/μm³ | Circle-equivalent diameter 10 to 60 nm Average number density of precipitates Number/μm³ | Circle-equivalent diameter 10 to 40 nm Average number density of precipitates Number/μm³ | Average crystal grain size μm | Tensile strength MPa | Erosion depth μm |
| Example of invention | 1 | A1 | 400 | 500 | 32.9 | 19.1 | 2.3 | 28.8 | 14.2 | 1.9 | 112 | 175 | 47 |
| | 2 | B1 | 380 | 500 | 33.1 | 25.4 | 8.1 | 31.5 | 18.1 | 4.6 | 133 | 189 | 41 |
| | 3 | B1 | 450 | — | 34.8 | 22.1 | 8.8 | 33.2 | 20.8 | 6.2 | 136 | 193 | 40 |
| | 4 | C1 | 400 | 480 | 42.2 | 26.9 | 12.6 | 37.5 | 23.4 | 10.3 | 140 | 231 | 40 |
| | 5 | D1 | 400 | 500 | 43.1 | 33.9 | 14.8 | 40.6 | 26.7 | 12.1 | 185 | 228 | 27 |
| | 6 | E1 | 380 | 500 | 45.9 | 34.4 | 18.1 | 44.7 | 29.1 | 14.6 | 189 | 235 | 23 |

TABLE 2-continued

| | | | | Al alloy clad sheet | | | | Al alloy clad sheet subjected to heating equivalent to brazing | | | | | |
| | | | | | Core Al alloy sheet | | | | Core Al alloy sheet | | | | | |
| Group | No. | Symbol of core composition in Table 1 | First low-temperature soaking temperature (only for core ingot) °C | Second high-temperature soaking temperature (for clad ingot) °C | Circle-equivalent diameter 10 to 100 nm Average number density of precipitates Number/μm³ | Circle-equivalent diameter 10 to 60 nm Average number densely of precipitates Number/μm³ | Circle-equivalent diameter 10 to 40 nm Average number density of precipitates Number/μm³ | Circle-equivalent diameter 10 to 100 nm Average number density of precipitates Number/μm³ | Circle-equivalent diameter 10 to 60 nm Average number density of precipitates Number/μm³ | Circle-equivalent diameter 10 to 40 nm Average number density of precipitates Number/μm³ | Average crystal grain size μm | Tensile strength MPa | Erosion depth μm |
|---|---|---|---|---|---|---|---|---|---|---|---|---|---|
| | 7 | F1 | 400 | 450 | 41.1 | 28.3 | 17.5 | 38.3 | 24.0 | 10.8 | 177 | 224 | 34 |
| | 8 | G1 | 410 | 500 | 38.2 | 29.4 | 11.7 | 36.6 | 22.9 | 9.4 | 142 | 221 | 39 |
| | 9 | H1 | 400 | 500 | 43.8 | 30.1 | 17.5 | 42.1 | 27.5 | 12.7 | 181 | 232 | 31 |
| | 10 | I1 | 390 | 500 | 45.3 | 33.3 | 17.7 | 44.4 | 28.7 | 14.3 | 187 | 229 | 25 |
| | 11 | J1 | 370 | 520 | 30.8 | 24.7 | 7.6 | 29.9 | 15.8 | 3.2 | 125 | 275 | 43 |
| | 12 | K1 | 400 | 500 | 43.2 | 30.3 | 16.1 | 41.5 | 26.9 | 12.4 | 174 | 249 | 33 |
| | 13 | L1 | 420 | 500 | 42.6 | 27.1 | 12.5 | 39.1 | 23.3 | 9.8 | 153 | 238 | 36 |
| Comparative example | 14 | B1 | — | 500 | 31.3 | 12.9 | 4.1 | 28.1 | 4.3 | 2.3 | 66 | 163 | 93 |
| | 15 | B1 | 300 | 500 | 24.7 | 15.2 | 21.1 | 22.3 | 10.9 | 17.7 | 89 | 169 | 75 |
| | 16 | B1 | — | 565 | 22.6 | 8.4 | 1.3 | 17.8 | 2.1 | 0.5 | 44 | 158 | 112 |
| | 17 | M1 | 400 | 500 | 28.1 | 13.8 | 1.4 | 24.7 | 9.4 | 1.1 | 91 | 146 | 68 |
| | 18 | N1 | 400 | 500 | 38.3 | 25.9 | 1.2 | 36.1 | 22.4 | 0.9 | 94 | 137 | 66 |
| | 19 | O1 | 400 | 500 | 24.2 | 18.5 | 5.2 | 21.9 | 15.3 | 2.4 | 73 | 131 | 87 |
| | 20 | P1 | 400 | 500 | 25.6 | 24.2 | 13.9 | 22.1 | 20.9 | 8.4 | 88 | 148 | 79 |
| | 21 | Q1 | 400 | 500 | 26.3 | 26.1 | 13.3 | 23.3 | 21.2 | 8.9 | 85 | 152 | 84 |
| | 22 | R1 | 400 | 500 | 21.4 | 10.6 | 1.2 | 18.7 | 3.2 | 0.6 | 48 | 140 | 103 |
| | 23 | S1 | 480 | 500 | 24.3 | 8.8 | 3.1 | 20.6 | 3.9 | 0.9 | 54 | 141 | 109 |
| | 24 | T1 | 400 | 500 | 51.4 | 12.1 | 5.6 | 49.1 | 9.2 | 1.3 | 87 | 225 | 74 |

(Examples and Comparative Examples of Aluminum-Alloy Clad Sheet of Second Technology)

Clad sheets (brazing sheets) 1 including 3000-series aluminum alloy cores 2 having compositions A2 to T2 shown in Table 3 were produced, and structures of the cores 2 were investigated. Each of the clad sheets 1 was then pre-stained by 10%, and was then subjected to heating equivalent to brazing, i.e., heated at 600° C. for 3 min as simulated brazing, and was then cooled at an average cooling rate of 100° C./min, and the structure of the core of the clad sheet subjected to the heating equivalent to brazing was investigated. Table 4 shows results of the investigations. In addition, mechanical properties and erosion resistance of each of the clad sheets subjected to the heating equivalent to brazing were evaluated. Table 4 also shows results of the evaluation.

(Production of Clad Sheet)

The clad sheets were produced as follows. The 3000-series aluminum alloy compositions A2 to T2 shown in Table 3 were melted and casted to produce aluminum-alloy core ingots. In each Example of the invention, only the core ingot was subjected to first soaking in which the ingot was in common held for 10 hours under the temperature condition shown in Table 4. The core ingot was then cladded with a sacrificial anti-corrosion material and a brazing material, and was then reheated as second soaking, in which the ingot was in common held for three hours. In Table 4, "first soaking temperature" is soaking temperature only for the core ingot, and "second soaking temperature" is soaking temperature for the clad sheet (clad ingot).

In the cladding of the core ingot 2, one surface of the core ingot 2 was cladded with a JIS 7072 aluminum alloy sheet having a composition of Al-1 mass % Zn as the sacrificial anti-corrosion material, and the other surface thereof was cladded with a JIS 4045 aluminum alloy sheet having a composition of Al-10 mass % Si as the brazing material. The clad ingot was then hot-rolled at the second soaking temperature. In this hot rolling, time from the end of the second soaking to start of the hot rolling was constant, i.e., 30 min.

Furthermore, the hot-rolled sheet was subjected to process annealing at the condition of temperature and time shown in Table 4 in a batch or continuous annealing furnace before cold rolling. In the batch annealing in each Example, the rate of temperature rise and the rate of temperature drop are the same, 40° C./hr. In the continuous annealing in each Example, the rate of temperature rise and the rate of temperature drop are also the same, 40° C./hr. In each Example, the sheet was in common subjected to finish annealing at 250° C. for 2 hr after cold rolling instead of annealing during cold rolling to be formed into a clad sheet (brazing sheet) as an H24 refined material 0.17 mm in thickness. Here, the thickness of the core aluminum alloy sheet was reduced to 0.11 mm.

In each Example, the clad sheet (brazing sheet) in common had a core aluminum alloy sheet having a thickness of 0.11 mm, and had the brazing material and the sacrificial anti-corrosion material laminated on the respective surfaces of the core, each material having a thickness within a range of 25 to 35 μm.

(Structure)

The above-described measurement methods were used to observe the structure of the core of the clad sheet as the cold-rolled clad sheet, and observe the structure of the core of the heated clad sheet. Specifically, average crystal grain size (μm) in a rolling direction in a longitudinal section along the rolling direction of the core of the clad sheet was measured by the above-described measurement method. The average crystal grain size of the core aluminum alloy sheet of the clad sheet as a raw material before being subjected to heating equivalent to brazing is not shown in Table 4. Such a core aluminum alloy sheet may have various structures depending on alloy compositions or manufacturing conditions, for example, an untreated worked structure and a recrystallized structure, and average grain size cannot be evaluated in some worked structure. Furthermore, no correspondence relationship was found between the above average crystal grain size and average crystal grain size of the core aluminum alloy sheet of the clad sheet subjected to heating equivalent to brazing.

Furthermore, an average Mn/Si compositional ratio (in terms of percent by mass) of Al—Mn—Si based dispersed particles each having a circle-equivalent diameter of 0.5 µm or less, which were observed on a rolling plane in the central part in the thickness of the core aluminum alloy sheet of each clad sheet, was determined. In addition, among the Al—Mn—Si based dispersed particles each having the circle-equivalent diameter of 0.5 µm or less, Al—Mn—Si based dispersed particles each having a Mn/Si compositional ratio (in terms of percent by mass) of 2.50 or more was defined to have a volume fraction a, and Al—Mn—Si based dispersed particles having a Mn/Si ratio (in terms of percent by mass) of less than 2.50 was defined to have a volume fraction b, and a ratio a/b was determined. Table 4 also shows results of the measurements. In Table 4, the volume fraction ratio a/b is simplified as volume fraction ratio a/b between dispersed particles having different Mn/Si compositional ratios. The measurements were performed by the above-described measurement methods.

(Mechanical Properties)

The clad sheets subjected to the heating equivalent to brazing were each subjected to a tensile test to measure the tensile strength (MPa) thereof. Table 4 shows results of the measurements. The test condition is similar to that for the Examples of the first technology.

(Erosion Resistance)

Erosion resistance was evaluated through measurement of erosion depth. A commercially available noncorrosive flux was applied by 3 to 5 g/m² onto the clad sheet before being subjected to the heating equivalent to brazing, and the clad sheet was held at 600° C. for 5 min or more in an atmosphere of oxygen concentration of 200 ppm or less to produce a brazed test piece. The longitudinal section along the rolling direction of the clad sheet subjected to heating equivalent to brazing is pretreated through mechanical polishing or electrolytic etching, and the longitudinal section is then observed in five viewing fields by a light microscope of 100 magnifications. The penetration depth (erosion depth) of the brazing material into the core was measured in the five viewing fields, and an average of the measured depths was determined as the erosion depth.

As shown in Tables 3 and 4, Examples 25 to 37 of the invention are each manufactured through soaking and process annealing under preferred conditions while the core aluminum alloy sheet (ingot) has a composition within the composition range of the invention (Example 27 of the invention is subjected to only one soaking).

Thus, as shown in Table 4, in each of the Examples 25 to 37, the core aluminum alloy sheet of the clad sheet (brazing sheet) has a structure that satisfies the specification of the invention. Specifically, Al—Mn—Si based dispersed particles each having a circle-equivalent diameter of 0.5 µm or less, which are observed on a rolling plane in the central part in the thickness of the core aluminum alloy sheet, has an average Mn/Si compositional ratio (in terms of percent by mass) of 2.50 or more. In addition, among the Al—Mn—Si based dispersed particles each having the circle-equivalent diameter of 0.5 µm or less, Al—Mn—Si based dispersed particles each having a Mn/Si compositional ratio (in terms of percent by mass) of 2.50 or more have a volume fraction a, and Al—Mn—Si based dispersed particles having a Mn/Si ratio (in terms of percent by mass) of less than 2.50 have a volume fraction b, and a ratio a/b is 0.50 or more. In addition, the core aluminum alloy sheet of the clad sheet subjected to the heating equivalent to brazing has an average crystal grain size coarsened to 120 µm or more in a rolling direction in a longitudinal section along the rolling direction.

As a result, in each of the Examples 25 to 37, even if the thickness of the core is reduced to less than 0.17 mm, i.e., 0.11 mm, the clad sheet subjected to heating equivalent to brazing has an excellent erosion resistance while having a predetermined strength. In other words, a brazing sheet reduced in thickness may also achieve improvement in strength and erosion resistance.

Among the Examples of the invention, however, the example 35 including an exemplary alloy J2 in Table 3, in which the core aluminum alloy sheet (ingot) has a relatively high Mg content of 0.8%, exhibits a significant reduction in brazability in the case of employing Nocolok brazing using a fluoride flux, which is however not shown in the test results. Thus, the content of Mg is preferably controlled to be 0.8% or less for a heat exchanger formed at a brazing condition where brazability is degraded by Mg, as described above.

In contrast, in each of the comparative examples 38 to 42, although the core aluminum alloy sheet (ingot) has a composition (B2) within the composition range of the invention, the soaking temperature is excessively low, or less than 450° C., in at least one of the first and second soakings, or the temperature of the process annealing is excessively low, or less than 450° C. In the comparative example 41, the process annealing is omitted.

Thus, as shown in Table 4, Al—Mn—Si based dispersed particles each having a circle-equivalent diameter of 0.5 µm or less, which are observed on a rolling plane in the central part in the thickness of the core aluminum alloy sheet of each of the comparative examples 38 to 42, has an excessively low average Mn/Si compositional ratio (in terms of percent by mass), i.e., less than 2.50. In addition, among the Al—Mn—Si based dispersed particles each having the circle-equivalent diameter of 0.5 µm or less, Al—Mn—Si based dispersed particles each having a Mn/Si compositional ratio (in terms of percent by mass) of 2.50 or more have a volume fraction a, and Al—Mn—Si based dispersed particles having a Mn/Si ratio (in terms of percent by mass) of less than 2.50 have a volume fraction b, and a ratio a/b is excessively low, i.e., less than 0.50. In addition, the core aluminum alloy sheet of the clad sheet subjected to the heating equivalent to brazing has an excessively small average crystal grain size, i.e., less than 120 µm, in a rolling direction in a longitudinal section along the rolling direction. As a result, as shown in Table 4, each of the clad sheets subjected to the heating equivalent to brazing of the comparative examples 38 to 42 in common has a low strength and a low erosion resistance.

In the comparative examples 43 to 50, the core aluminum alloy sheets (ingots) have compositions M2, N2, O2, P2, Q2, R2, S2, and T2 (Table 3) out of the composition range of the invention. The soaking temperature is excessively low, i.e., less than 450° C., in at least one of the first and second soakings, and/or the temperature of the process annealing is excessively low, i.e., less than 500° C.

Thus, Al—Mn—Si based dispersed particles each having a circle-equivalent diameter of 0.5 μm or less, which are observed on a rolling plane in the central part in the thickness of the core aluminum alloy sheet, also has an excessively low average Mn/Si compositional ratio (in terms of percent by mass), i.e., less than 2.50. In addition, among the Al—Mn—Si based dispersed particles each having the circle-equivalent diameter of 0.5 μm or less of the comparative examples 43 to 48 and 50, Al—Mn—Si based dispersed particles each having a Mn/Si compositional ratio (in terms of percent by mass) of 2.50 or more have a volume fraction a, and Al—Mn—Si based dispersed particles having a Mn/Si ratio (in terms of percent by mass) of less than 2.50 have a volume fraction b, and a ratio a/b is also excessively low, i.e., less than 0.50. In addition, the core aluminum alloy sheet of the clad sheet subjected to the heating equivalent to brazing has an excessively small average crystal grain size, i.e., less than 120 μm, in a rolling direction in a longitudinal section along the rolling direction. As a result, as shown in Table 4, the clad sheets subjected to the heating equivalent to brazing of the comparative examples each have a low strength and a low erosion resistance.

In the comparative example 43, the content of Si is excessively low as indicated by the alloy symbol M2 in Table 3.

In the comparative example 44, the content of Cu is excessively low as indicated by the alloy symbol N2 in Table 3.

In the comparative example 45, the content of Mn is excessively low as indicated by the alloy symbol O2 in Table 3.

In the comparative example 46, the content of Fe is excessively high as indicated by the alloy symbol P2 in Table 3.

In the comparative example 47, the content of Ti is excessively low as indicated by the alloy symbol Q2 in Table 3.

In the comparative examples 48 and 49, Cr, Zr, and Ni are not contained as indicated by the alloy symbols R2 and S2, respectively, in Table 3.

In the comparative example 50, the content of Zn is excessively high as indicated by the alloy symbol T2 in Table 3.

Consequently, the results of the above Examples support the critical meaning and advantageous effects of the points of the second technology of the invention for improving the strength and the erosion resistance of the core and in turn of the clad sheet. Specifically, the results support the meaning of controlling the average number density of the dispersed particles in the structure of the core, and controlling the composition of the Al—Mn—Si based dispersed particles in the above dispersed particles such that the α dispersed particles having a low content of Si are increased while the β dispersed particles having a high content of Si are decreased. In this way, the composition of the dispersed particles is controlled to increase the amount of dissolved Si, thus allowing improvement in strength and erosion resistance of the core and in turn of the clad sheet. Consequently, the results support the critical meaning and advantageous effects of the points of the second technology of the invention for improving the mechanical properties of the clad sheet for a heat exchanger or of the clad sheet subjected to heating equivalent to brazing.

TABLE 3

| | | Composition of core Al alloy sheet (percent by mass, the remainder is Al) | | | | | | | | | |
|---|---|---|---|---|---|---|---|---|---|---|---|
| Group | Symbol | Si | Fe | Cu | Mn | Mg | Cr | Zr | Ni | Zn | Ti |
| Example of invention | A2 | 0.4 | 0.1 | 0.7 | 1.0 | — | — | 0.02 | — | — | 0.1 |
| | B2 | 0.7 | 0.1 | 0.7 | 1.0 | — | — | 0.07 | — | — | 0.1 |
| | C2 | 09 | 0.1 | 0.8 | 1.0 | 0.3 | — | 0.15 | — | — | 0.1 |
| | D2 | 1.2 | 0.1 | 0.7 | 1.0 | — | — | 0.3 | — | — | 0.1 |
| | E2 | 1.0 | 0.1 | 0.05 | 1.0 | — | 0.03 | 0.4 | — | — | 0.1 |
| | F2 | 0.7 | 0.1 | 0.5 | 1.0 | 0.1 | 0.07 | 0.15 | — | — | 0.1 |
| | G2 | 0.8 | 0.1 | 1.1 | 1.2 | — | 0.15 | — | — | — | 0.1 |
| | H2 | 1.0 | 1.0 | 1.2 | 0.5 | — | 0.4 | 0.1 | — | — | 0.1 |
| | I2 | 1.5 | 0.1 | 0.7 | 0.8 | — | 0.1 | 0.3 | 0.03 | — | 0.1 |
| | J2 | 0.9 | 0.1 | 0.6 | 1.7 | 0.8 | — | — | 0.07 | 0.2 | 0.1 |
| | K2 | 0.7 | 0.1 | 0.7 | 1.0 | 0.4 | — | 0.1 | 0.1 | — | 0.03 |
| | L2 | 0.8 | 0.1 | 0.7 | 1.0 | — | 0.1 | — | 0.4 | 0.6 | 0.3 |
| Comparative example | M2 | 0.2 | 0.1 | 0.7 | 1.0 | — | — | 0.15 | — | — | 0.1 |
| | N2 | 0.8 | 0.1 | — | 1.0 | — | — | 0.15 | — | — | 0.1 |
| | O2 | 0.7 | 0.1 | 0.7 | 0.4 | — | — | 0.15 | — | — | 0.1 |
| | P2 | 0.8 | 1.2 | 0.8 | 1.0 | — | — | 0.1 | — | — | 0.1 |
| | Q2 | 0.9 | 0.1 | 0.7 | 1.0 | — | — | 0.15 | — | — | — |
| | R2 | 0.8 | 0.1 | 0.7 | 0.8 | — | — | — | — | — | 0.1 |
| | S2 | 1.2 | 0.1 | 0.6 | 1.0 | — | — | — | — | — | 0.1 |
| | T2 | 0.8 | 0.1 | 0.7 | 1.0 | — | 0.1 | 0.15 | 0.3 | 1.2 | 0.1 |

*In description of the content, *—*represents the content equal to or lower than the detection limit.

TABLE 4

| | | | | | | Core Al alloy sheet | | | Al alloy clad sheet subjected to heating equivalent to brazing | | | | |
|---|---|---|---|---|---|---|---|---|---|---|---|---|---|
| | | | | | | | | | Al alloy clad sheet | | | | |
| Group | No. | core symbol in Table 1 | First soaking temperature (only for core ingot) °C. | Second soaking temperature (for clad ingot) °C. | Process annealing condition (batch or continuous) | Average number density of dispersed particles having circle-equivalent diameter of 0.5 µm or less number/µm³ | Average Mn/Si compositional ratio of Al-Mn-Si based dispersed particles | Volume fraction ratio a/b between dispersed particles having different Mn/Si compositional ratios | Average number density of dispersed particles having circle-equivalent diameter of 0.5 µm or less number/µm³ | Average Mn/Si compositional ratio of Al-Mn-Si based dispersed particles | Volume fraction ratio a/b between dispersed particles having different Mn/Si compositional ratios | Average crystal grain size µm | Tensile strength Mpa | Erosion depth µm |
| Example of invention | 25 | A2 | 450 | 420 | Continuous: 450° C. × 2 min | 10.4 | 2.65 | 0.61 | 5.2 | 2.71 | 0.62 | 127 | 181 | 41 |
| | 26 | B2 | 470 | 450 | Batch: 450° C. × 1 hr | 13.1 | 2.69 | 0.68 | 7.5 | 2.74 | 0.70 | 146 | 194 | 38 |
| | 27 | B2 | 450 | — | Batch: 450° C. × 2 hr | 13.8 | 2.86 | 0.82 | 7.9 | 2.91 | 0.83 | 149 | 197 | 37 |
| | 28 | C2 | 520 | 470 | Continuous: 460° C. × 5 min | 16.1 | 2.92 | 0.90 | 9.7 | 2.98 | 0.91 | 152 | 238 | 33 |
| | 29 | D2 | 450 | 520 | Continuous: 460° C. × 3 min | 17.2 | 2.84 | 0.87 | 11.4 | 2.87 | 0.89 | 168 | 232 | 25 |
| | 30 | E2 | 490 | 500 | Batch: 460° C. × 30 min | 12.2 | 2.89 | 0.92 | 6.9 | 2.94 | 0.93 | 165 | 233 | 21 |
| | 31 | F2 | 540 | 450 | Continuous: 455° C. × 10 min | 11.8 | 2.71 | 0.67 | 6.3 | 2.76 | 0.67 | 157 | 229 | 33 |
| | 32 | G2 | 580 | 460 | Continuous: 455° C. × 5 min | 17.5 | 3.09 | 0.92 | 13.9 | 3.14 | 0.93 | 150 | 223 | 36 |
| | 33 | H2 | 480 | 480 | Continuous: 470° C. × 1 min | 16.9 | 2.92 | 0.89 | 10.2 | 2.99 | 0.90 | 193 | 234 | 30 |
| | 34 | I2 | 550 | 520 | Batch: 470° C. × 2 hr | 19.8 | 3.1 | 0.93 | 14.2 | 3.14 | 0.93 | 196 | 235 | 24 |
| | 35 | J2 | 460 | 520 | Batch: 490° C. × 2 hr | 24.3 | 2.97 | 0.91 | 19.8 | 3.03 | 0.92 | 134 | 280 | 40 |
| | 36 | K2 | 570 | 450 | Continuous: 490° C. × 2 min | 14.4 | 3.01 | 0.88 | 8.3 | 3.06 | 0.89 | 178 | 251 | 30 |
| | 37 | L2 | 500 | 520 | Continuous: 480° C. × 5 min | 15.7 | 3.04 | 0.94 | 9.1 | 3.09 | 0.95 | 159 | 240 | 34 |
| Comparative example | 38 | B2 | — | 400 | Continuous: 400° C. × 5 min | 31.8 | 2.33 | 0 42 | 27.4 | 2.38 | 0.43 | 73 | 159 | 87 |
| | 39 | B2 | 300 | 400 | Batch: 380° C. × 2 hr | 36.2 | 2.3 | 0.38 | 32.6 | 2.34 | 0.39 | 82 | 167 | 83 |
| | 40 | B2 | 400 | 400 | Batch: 430° C. × 1 hr | 28.7 | 2.38 | 0 44 | 24.9 | 2.42 | 0.46 | 91 | 170 | 69 |
| | 41 | B2 | 400 | 450 | Process annealing is omitted | 29.3 | 2.41 | 0.43 | 26.2 | 2.47 | 0.45 | 87 | 172 | 69 |
| | 42 | B2 | 400 | 400 | Continuous: 440° C. × 1 min | 28.1 | 2.4 | 0.41 | 23.9 | 2.45 | 0.43 | 106 | 171 | 64 |
| | 43 | M2 | 400 | 440 | Continuous: 430° C. × 2 min | 29.2 | 2.38 | 0.40 | 25.8 | 2.43 | 0.41 | 85 | 143 | 75 |
| | 44 | N2 | 440 | 400 | Continuous: 420° C. × 5 min | 29.6 | 2.37 | 0.39 | 26.1 | 2.42 | 0.4 | 79 | 134 | 86 |
| | 45 | O2 | 440 | 400 | Process annealing is omitted | 30.7 | 2.31 | 0.36 | 27.9 | 2.36 | 0.36 | 66 | 145 | 104 |
| | 46 | P2 | 400 | 500 | Process annealing is omitted | 33.5 | 2.39 | 0.38 | 29.2 | 2.43 | 0.39 | 74 | 152 | 90 |
| | 47 | Q2 | 400 | 500 | Continuous: 380° C. × 2 min | 35.4 | 2.38 | 0.41 | 30.7 | 2.41 | 0.42 | 89 | 155 | 80 |
| | 48 | R2 | 400 | 500 | Batch: 400° C. × 1 hr | 32.2 | 2.37 | 0 45 | 28.1 | 2.42 | 0.46 | 81 | 150 | 79 |
| | 49 | S2 | 470 | 400 | Continuous: 420° C. × 5 min | 36.8 | 2.38 | 0.53 | 31.1 | 2.43 | 0.53 | 70 | 151 | 82 |
| | 50 | T2 | 400 | 500 | Batch: 410° C. × 2 hr | 42.9 | 2.34 | 0 46 | 37.4 | 2.40 | 0.47 | 92 | 173 | 66 |

According to the invention, a thin brazing sheet including a core having a reduced thickness of less than 0.2 mm may also achieve improvement in strength and erosion resistance. As a result, the invention can provide an aluminum-alloy clad sheet and a clad sheet subjected to heating equivalent to brazing, which each have a high strength and an excellent erosion resistance, and thus allow a reduction in thickness of a clad sheet subjected to heating equivalent to brazing such as an aluminum-alloy radiator tube, and/or of a clad sheet such as an aluminum-alloy brazing sheet. Consequently, the invention is preferably used for an aluminum-alloy heat exchanger for, for example, a motor vehicle, which is required to have a radiator tube reduced in thickness and have excellent fatigue characteristics.

What is claimed is:

1. An aluminum-alloy clad sheet to be formed into a heat exchanger by brazing, the aluminum-alloy clad sheet including at least a core aluminum alloy sheet and an aluminum-alloy sacrificial anti-corrosive material cladded with each other,
   wherein the aluminum-alloy clad sheet has an aluminum alloy composition containing, in percent by mass, 0.5 to 1.8% Mn, 0.2 to 1.5% Si, 0.05 to 1.2% Cu, and 0.03 to 0.3% Ti, containing Fe controlled to be 1.0% or less (including 0%), and containing one or more of 0.02 to 0.4% Cr, 0.02 to 0.4% Zr, and 0.02 to 0.4% Ni, with the remainder including Al and inevitable impurities, and
   precipitates each having a circle-equivalent diameter of 100 nm or less, the precipitates being observed by a transmission electron microscope (TEM) at 10,000 power on a rolling plane in the central part in the thickness of the core aluminum alloy sheet, have a grain size distribution wherein
      average number density of the precipitates within a range of the circle-equivalent diameter of 10 to 100 nm is 30 per cubic micrometer or more,
      average number density of the precipitates within a range of the circle-equivalent diameter of 10 to 60 nm is 15 per cubic micrometer or more, and
      average number density of the precipitates within a range of the circle-equivalent diameter of 10 to 40 nm is 1.5 per cubic micrometer or more.

2. The core aluminum alloy sheet according to claim 1, wherein the core aluminum alloy sheet of the clad sheet is further controlled in Mg content to be 0.5% or less.

3. The core aluminum alloy sheet according to claim 1 or 2, wherein the core aluminum alloy sheet of the clad sheet has a structure subjected to the heating equivalent to brazing,
   wherein the core aluminum alloy sheet has an average crystal grain size of 100 to 200 µm in a rolling direction in a longitudinal section along the rolling direction, and
   precipitates each having a circle-equivalent diameter of 100 nm or less, the precipitates being observed by TEM at 10,000 power on a rolling plane in the central part in the thickness of the core aluminum alloy sheet, have a grain size distribution wherein
      average number density of the precipitates within a range of the circle-equivalent diameter of 10 to 100 nm is 25 per cubic micrometer or more,
      average number density of the precipitates within a range of the circle-equivalent diameter of 10 to 60 nm is 10 per cubic micrometer or more, and
      average number density of the precipitates within a range of the circle-equivalent diameter of 10 to 40 nm is 1.2 per cubic micrometer or more.

4. An aluminum-alloy clad sheet to be formed into a heat exchanger by brazing, the aluminum-alloy clad sheet including at least a core aluminum alloy sheet and an aluminum-alloy sacrificial anti-corrosive material cladded with each other,
   wherein the aluminum-alloy clad sheet has an aluminum alloy composition containing, in percent by mass, 0.5 to 1.8% Mn, 0.4 to 1.5% Si, 0.05 to 1.2% Cu, and 0.03 to 0.3% Ti, containing Fe controlled to be 1.0% or less (including 0%), and containing one or more of 0.02 to 0.4% Cr, 0.02 to 0.4% Zr, and 0.02 to 0.4% Ni, with the remainder including Al and inevitable impurities, and
   the average number density of dispersed particles each having a circle-equivalent diameter of 0.5 µm or less is 10 to 25 per cubic micrometer, the dispersed particles being observed on a rolling plane in the central part in the thickness of the core aluminum alloy sheet, and
   among the dispersed particles each having the circle-equivalent diameter of 0.5 µm or less, Al—Mn—Si based dispersed particles have an average Mn/Si compositional ratio (in terms of percent by mass) of 2.50 or more, and
   among the Al—Mn—Si based dispersed particles each having the circle-equivalent diameter of 0.5 µm or less, Al—Mn—Si based dispersed particles each having a Mn/Si compositional ratio (in terms of percent by mass) of 2.50 or more have a volume fraction a, and Al—Mn—Si based dispersed particles each having a Mn/Si ratio (in terms of percent by mass) of less than 2.50 have a volume fraction b, and a ratio a/b is 0.50 or more.

5. The aluminum-alloy clad sheet according to claim 4, wherein the core aluminum alloy sheet of the clad sheet is further controlled in Mg content to be 0.8% or less (including 0%).

6. The aluminum-alloy clad sheet according to claim 4 or 5, wherein the aluminum-alloy clad sheet preferably has a structure in each of the case where the aluminum-alloy clad sheet is subjected to heating corresponding to brazing, and the case where the aluminum-alloy clad sheet is formed into a heat exchanger by brazing,
   wherein dispersed particles each having a circle-equivalent diameter of 0.5 µm or less, the dispersed particles being observed in the central part in the thickness of the core aluminum alloy sheet, has an average number density of 5 to 20 per cubic micrometer, and
   among the dispersed particles each having the circle-equivalent diameter of 0.5 µm or less, Al—Mn—Si based dispersed particles have an average Mn/Si compositional ratio (in terms of percent by mass) of 2.50 or more, and
   among the Al—Mn—Si based dispersed particles each having the circle-equivalent diameter of 0.5 µm or less, Al—Mn—Si based dispersed particles each having a Mn/Si compositional ratio (in terms of percent by mass) of 2.50 or more have a volume fraction a, and Al—Mn—Si based dispersed particles each having a Mn/Si ratio (in terms of percent by mass) of less than 2.50 have a volume fraction b, and a ratio a/b is 0.50 or more.

7. The aluminum-alloy clad sheet according to claim 1 or 4, wherein the core aluminum alloy sheet of the clad sheet further contains 0.2 to 1.0% Zn.

8. The aluminum-alloy clad sheet according to claim 1 or 4, wherein the core aluminum alloy sheet of the clad sheet has a thickness of less than 0.17 mm.

9. The aluminum-alloy clad sheet according to claim 1 or 4, wherein the clad sheet has a thickness of less than 0.2 mm.

* * * * *